United States Patent
Shen et al.

(10) Patent No.: US 12,491,886 B2
(45) Date of Patent: Dec. 9, 2025

(54) ELECTRIC VEHICLE AND ELECTRIC-MACHINERY CONTROL METHOD THEREFOR, APPARATUS AND STORAGE MEDIUM

(71) Applicants: Zhejiang ZEEKR Intelligent Technology Co., Ltd., Zhejiang (CN); VIRIDI E-MOBILITY TECHNOLOGY (NINGBO) CO., LTD., Zhejiang (CN); Zhejiang Geely Holding Group Co., LTD., Zhejiang (CN)

(72) Inventors: Keqing Shen, Zhejiang (CN); Yingguo Ma, Zhejiang (CN); Dong Chen, Zhejiang (CN); Qimiao Chen, Zhejiang (CN); Changluo Li, Zhejiang (CN)

(73) Assignees: Zhejiang ZEEKR Intelligent Technology Co., Ltd., Zhejiang (CN); VIRIDI E-MOBILITY TECHNOLOGY (NINGBO) CO., LTD., Zhejiang (CN); Zhejiang Geely Holding Group Co., LTD., Zhejiang (CN)

( * ) Notice: Subject to any disclaimer, the term of this patent is extended or adjusted under 35 U.S.C. 154(b) by 0 days.

(21) Appl. No.: 18/729,507

(22) PCT Filed: Jan. 16, 2023

(86) PCT No.: PCT/CN2023/072460
§ 371 (c)(1),
(2) Date: Jul. 17, 2024

(87) PCT Pub. No.: WO2024/021543
PCT Pub. Date: Feb. 1, 2024

(65) Prior Publication Data
US 2025/0091450 A1   Mar. 20, 2025

(30) Foreign Application Priority Data

Jul. 28, 2022 (WO) ............... PCT/CN2022/108470

(51) Int. Cl.
*B60W 30/20* (2006.01)
*B60L 15/20* (2006.01)
(Continued)

(52) U.S. Cl.
CPC ......... *B60W 30/20* (2013.01); *B60L 15/2054* (2013.01); *B60R 16/0231* (2013.01);
(Continued)

(58) Field of Classification Search
None
See application file for complete search history.

(56) References Cited

U.S. PATENT DOCUMENTS 7,577,507 B2   8/2009   Morris
8,961,367 B2 *  2/2015   Suzuki ................ B60W 10/06
                                                 477/109
(Continued)

FOREIGN PATENT DOCUMENTS

CN   101042183   9/2007
CN   106163853   11/2016
(Continued)

OTHER PUBLICATIONS

"International Search Report (Form PCT/ISA/210) of PCT/CN2023/072460," mailed on Apr. 17, 2023, with English translation thereof, pp. 1-6.
(Continued)

*Primary Examiner* — Todd Melton
(74) *Attorney, Agent, or Firm* — JCIPRNET

(57) ABSTRACT

The present application relates to the field of electric vehicles, and particularly to an electric vehicle and an
(Continued)

electric-machinery control method therefor, an apparatus and a storage medium. The electric-machinery control method for the electric vehicle of the present application includes: detecting a relative deformation amount of a transmission system between a driving gear and a wheel end of an electric machinery; determining a first speed differential value between a first driving-gear rotational speed and a first wheel-end converted rotational speed when the relative deformation amount is a first threshold value; determining an output torque of the electric machinery according to the first speed differential value; controlling the driving gear to perform a gear-approaching operation relative to the driven gear according to the output torque.

20 Claims, 18 Drawing Sheets

(51) Int. Cl.
  *B60R 16/023* (2006.01)
  *B60W 10/08* (2006.01)
  *B60W 10/10* (2012.01)
(52) U.S. Cl.
  CPC ............ *B60W 10/08* (2013.01); *B60W 10/10* (2013.01); *B60L 2240/423* (2013.01); *B60L 2240/461* (2013.01); *B60L 2240/486* (2013.01); *B60L 2250/28* (2013.01); *B60W 2510/083* (2013.01); *B60W 2510/105* (2013.01)

(56) References Cited

U.S. PATENT DOCUMENTS

| | | |
|---|---|---|
| 2017/0015213 A1 | 1/2017 | Terada et al. |
| 2018/0072306 A1 | 3/2018 | Yamazaki et al. |

FOREIGN PATENT DOCUMENTS

| | | |
|---|---|---|
| CN | 107539165 | 1/2018 |
| CN | 107813815 | 3/2018 |
| CN | 111071235 | 4/2020 |
| CN | 111288157 | 6/2020 |
| CN | 111516695 | 8/2020 |
| CN | 111619364 | 9/2020 |
| CN | 113119986 | 7/2021 |
| CN | 113968139 | 1/2022 |
| CN | 114046352 | 2/2022 |
| JP | 2012111448 | 6/2012 |
| JP | 2015192516 | 11/2015 |
| JP | 2019022339 | 2/2019 |
| JP | 2019151257 | 9/2019 |
| JP | 2019154099 | 9/2019 |
| JP | 2019166936 | 10/2019 |
| JP | 2021154776 | 10/2021 |
| WO | 2022095991 | 5/2022 |

OTHER PUBLICATIONS

"Written Opinion of the International Searching Authority (Form PCT/ISA/237) of PCT/CN2023/072460," mailed on Apr. 17, 2023, with English translation thereof, pp. 1-6.
"International Search Report (Form PCT/ISA/210) of PCT/CN2022/108470," mailed on Sep. 22, 2022, with English translation thereof, pp. 1-6.
"Written Opinion of the International Searching Authority (Form PCT/ISA/237) of PCT/CN2022/108470," mailed on Sep. 22, 2022, with English translation thereof, pp. 1-6.
"Notice of Reasons for Refusal of Japan Counterpart Application", issued on Sep. 3, 2025, with English translation thereof, p. 1-p. 8.
"Request for the Submission of an Opinion of Korea Counterpart Application", issued on Sep. 12, 2025, with English translation thereof, p. 1-p. 17.
"Search Report of Europe Counterpart Application", issued on Sep. 16, 2025, p. 1-p. 9.

* cited by examiner

ELECTRIC VEHICLE AND ELECTRIC-MACHINERY CONTROL METHOD THEREFOR, APPARATUS AND STORAGE MEDIUM

CROSS-REFERENCE TO RELATED APPLICATION

The present application is a national state of International Application No. PCT/CN2023/072460, filed on Jan. 16, 2023, which claims priority to International Application No. PCT/CN2022/108470a, titled "ELECTRIC VEHICLE AND ELECTRIC-MACHINERY CONTROL METHOD THEREFOR, APPARATUS AND STORAGE MEDIUM" and filed on Jul. 28, 2022, both of which are hereby incorporated by reference in their entireties.

TECHNICAL FIELD

The present application relates to the field of electric vehicles and, in particular, to an electric vehicle and an electric-machinery control method therefor, an apparatus and a storage medium.

BACKGROUND

With the development of electric vehicle technology, the application scope of electric vehicles is becoming more and more extensive. For a user, driving comfort is one of the main reasons for choosing an electric vehicle. However, in a driving process of the electric vehicle, when an output torque of an electric machinery changes between a positive torque and a negative torque, as the gear meshing direction of the electric machinery changes, a gear rattle may be caused, thus generating vibration and noise that the user can obviously perceive and affecting driving comfort. In addition, the gear rattle may also cause damage to transmission mechanisms such as gears or splines.

At present, in order to solve the above problems, usually when changing the output torque of the electric machinery between the positive torque and the negative torque, the output torque is processed by a filtering processing method, such as a torque smoothing processing method, to reduce vibration and noise. However, there is still large vibration and noise with this manner, which leads to a poor driving experience for the user.

SUMMARY

Embodiments of the present application provide an electric vehicle and an electric-machinery control method therefor, an apparatus and a storage medium, which are used for solving the problems that an electric machinery and a transmission system thereof have large vibration and noise during travelling of an electric vehicle.

In a first aspect, an embodiment of the present application provides an electric-machinery control method for an electric vehicle, including: detecting a relative deformation amount of a transmission system between a driving gear and a wheel end of an electric machinery; determining a first speed differential value between a first driving-gear rotational speed and a first wheel-end converted rotational speed when the relative deformation amount is a first threshold value, where the relative deformation amount being the first threshold value is used for indicating that the driving gear and a driven gear of the transmission system start to disengage, the first driving-gear rotational speed is a rotational speed of the driving gear at a disengagement moment that the driving gear and the driven gear disengage, and the first wheel-end converted rotational speed is a rotational speed obtained by performing a speed ratio conversion on a rotational speed of the wheel end of the electric vehicle at the disengagement moment; determining an output torque of the electric machinery according to the first speed differential value; controlling the driving gear to perform a gear-approaching operation relative to the driven gear according to the output torque.

In a possible implementation, the determining the output torque of the electric machinery according to the first speed differential value includes: determining a product of the first speed differential value and a first time duration as a first product, where the first time duration is a time duration from the disengagement time to a contact moment that the driving gear and the driven gear contact; if the first product is less than a preset backlash value, determining that the output torque includes a first torque and a second torque, where a direction of the first torque and a direction of the second torque are opposite, the first torque is a torque required within a time interval from the disengagement moment to a transition moment that the electric machinery transitions between an acceleration state and a deceleration state, and the second torque is a torque required within a time interval from the transition moment to the contact moment.

In a possible implementation, the first torque and the second torque are determined in a following manner: at the transition moment, determining a second speed differential value between a current driving-gear rotational speed and a second wheel-end converted rotational speed through the preset backlash value, the first speed differential value and the first time duration, where the second wheel-end converted rotational speed is a rotational speed obtained by performing a speed ratio conversion on the rotational speed of the wheel end of the electric vehicle at the transition moment; determining a second driving-gear rotational speed according to the second speed differential value and the second wheel-end converted rotational speed, where the second driving-gear rotational speed is a rotational speed of the driving gear at the transition moment; determining the first torque according to the second driving-gear rotational speed, the first driving-gear rotational speed, a time duration between the disengagement moment and the transition moment, and a sliding friction of the driving gear at the second driving-gear rotational speed; determining the second torque according to the second driving-gear rotational speed, a third driving-gear rotational speed, a time duration between the transition moment and the contact moment, and a sliding friction of the driving gear at the third driving-gear rotational speed, where the third driving-gear rotational speed is a rotational speed of the driving gear at the contact moment.

In a possible implementation, the determining the output torque of the electric machinery according to the first speed differential value further includes: if the first product is greater than or equal to the preset backlash value, determining a product of the first speed differential value and a second time duration as a second product, where the second time duration is a time duration from the disengagement moment to the transition moment; if the second product is less than the preset backlash value, determining that the output torque includes the first torque and the second torque, where the direction of the first torque and the direction of the second torque are the same.

In a possible implementation, the determining the output torque of the electric machinery according to the first speed differential value further includes: if the second product is greater than or equal to the preset backlash value, determining a third wheel-end converted rotational speed at a target moment, where the third wheel-end converted rotational speed is a rotational speed obtained by performing a speed ratio conversion on the rotational speed of the wheel end of the electric vehicle at the target moment, and the target moment is a moment that the driving gear and the driven gear re-contact within the second time duration; determining a third torque according to the third wheel-end converted rotational speed, the first driving-gear rotational speed, and a time duration between the disengagement moment and the target moment, where the third torque is a torque required within a time interval from the disengagement moment to the target moment, and the output torque includes the third torque.

In a possible implementation, the detecting the relative deformation amount of the transmission system between the driving gear and the wheel end of the electric machinery further includes: upon detecting that the output torque of the electric machinery changes, determining a third speed differential value between a current driving-gear rotational speed and a current driven-gear rotational speed; determining a relative displacement of the driving gear and the driven gear according to the third speed differential value; determining the relative deformation amount according to the relative displacement.

In a possible implementation, the determining the output torque of the electric machinery includes: acquiring driving state information corresponding to an adjusted target driving state in response to an adjustment operation for adjusting a driving state; performing conversion processing on the driving state information to obtain a digital signal; performing analysis processing on the digital signal to obtain a torque signal; determining the output torque according to the torque signal.

In a possible implementation, the digital signal represents different driving states of the electric vehicle through different numerical values, and the performing the analysis processing on the digital signal to obtain the torque signal includes: determining the torque signal to be a first preset signal when the digital signal is a first numerical value; determining the torque signal to be a second preset signal when the digital signal is a second numerical value; determining the torque signal to be a target signal according to the first preset signal, the second preset signal and a first target numerical value when the digital signal is the first target numerical value; where the first numerical value is less than the second numerical value, the first target numerical value is greater than the first numerical value and less than the second numerical value, the first preset signal is a torque signal when a sensitivity corresponding to the driving state of the electric vehicle is lowest, the second preset signal is a torque signal when the sensitivity corresponding to the driving state of the electric vehicle is highest, and the target signal is a torque signal when the sensitivity corresponding to the driving state of the electric vehicle is between a highest sensitivity and a lowest sensitivity.

In a possible implementation, when the torque signal is the target signal, the determining the output torque according to the torque signal includes: acquiring a fourth torque corresponding to the first preset signal and a fifth torque corresponding to the second preset signal; determining a third product of the first target numerical value and the fifth torque; determining a first target differential value between a preset value and the first target numerical value, and determining a fourth product of the first target differential value and the fourth torque; determining a sum of the third product and the fourth product as the output torque.

In a possible implementation, the determining the third product of the first target numerical value and the fifth torque includes: acquiring a preset coefficient, where the preset coefficient is used for indicating a driving state preference coefficient; determining a product of the first target numerical value, the preset coefficient and the fifth torque as the third product.

In a possible implementation, the digital signal represents different gear-approaching moments in a gear-approaching process of the driving gear relative to the driven gear through different numerical values, and the electric-machinery control method further includes: determining a corresponding first moment when the digital signal is a third numerical value and a corresponding second moment when the digital signal is a fourth numerical value; determining a target gear-approaching moment in the gear-approaching process of the driving gear relative to the driven gear according to the first moment, the second moment and a second target numerical value when the digital signal is the second target numerical value; where the third numerical value is less than the fourth numerical value, the second target numerical value is larger than the third numerical value and less than the fourth numerical value, the first moment is a moment that a sensitivity corresponding to the driving state of the electric vehicle is lowest, and the second moment is a moment that the sensitivity corresponding to the driving state of the electric vehicle is highest.

In a possible implementation, the determining the target gear-approaching moment in the gear-approaching process of the driving gear relative to the driven gear according to the first moment, the second moment and the second target numerical value includes: determining a fifth product of the second target numerical value and the second moment; determining a second target differential value between a preset value and the second target numerical value, and determining a sixth product of the second target differential value and the first moment; determining a sum of the fifth product and the sixth product as the target gear-approaching moment.

In a possible implementation, the adjustment operation for adjusting the driving state includes at least one of the following: performing a sliding operation on a virtual sliding component in a first sliding area, where the virtual sliding component is a component displayed on a display screen of the electric vehicle, the first sliding area is a preset area on the display screen, and different positions of the virtual sliding component on the first sliding area represent different driving states; performing a sliding operation on a physical sliding apparatus in a second sliding area, where the physical sliding apparatus is an apparatus arranged on the electric vehicle, the second sliding area is a preset area arranged on the electric vehicle, and different positions of the physical sliding apparatus on the second sliding area represent different driving states; performing a selecting operation on preset adjustable options, where the adjustable options include a virtual button displayed on the display screen and/or a physical button arranged on the electric vehicle, and different adjustable options represent different driving states.

In a possible implementation, when the adjustment operation is the selection operation for a preset adjustable option, the adjustable option corresponds to a preset position in the first sliding area and/or the second sliding area.

In a possible implementation, the determining the output torque includes: acquiring a position signal corresponding to a target position in the first sliding area and/or the second sliding area in response to the adjustment operation, where the position signal represents different driving states of the electric vehicle through different numerical values; determining a corresponding sixth torque when the position signal is a fifth numerical value and a corresponding seventh torque when the digital signal is a sixth numerical value; determining the output torque according to the sixth torque, the seventh torque and a third target numerical value when the position signal is the third target numerical value; where the fifth numerical value is less than the sixth numerical value, the third target numerical value is greater than the fifth numerical value and less than the sixth numerical value, the sixth torque is a torque corresponding to a moment that a sensitivity corresponding to the driving state of the electric vehicle is lowest, and the seventh torque is a torque corresponding to a moment that the sensitivity corresponding to the driving state of the electric vehicle is highest.

In a possible implementation, the determining the output torque according to the sixth torque, the seventh torque and the third target numerical value includes: determining a seventh product of the third target numerical value and the seventh torque; determining a third target differential value between a preset value and the third target numerical value, and determining an eighth product of the third target differential value and the sixth torque; determining a sum of the seventh product and the eighth product as the output torque.

In a second aspect, an embodiment of the present application provides an electric-machinery control apparatus for an electric vehicle, including: a detection module, configured to detect a relative deformation amount of a transmission system between a driving gear and a wheel end of an electric machinery; a determining module, configured to determine a first speed differential value between a first driving-gear rotational speed and a first wheel-end converted rotational speed when the relative deformation amount is a first threshold value, where the relative deformation amount being the first threshold value is used for indicating that the driving gear and a driven gear of the transmission system start to disengage, the first driving-gear rotational speed is a rotational speed of the driving gear at a disengagement moment that the driving gear and the driven gear disengage, and the first wheel-end converted rotational speed is a rotational speed obtained by performing a speed ratio conversion on a rotational speed of the wheel end of the electric vehicle at the disengagement moment; a processing module, configured to determine an output torque of the electric machinery according to the first speed differential value; a control module, configured to control the driving gear to perform a gear-approaching operation relative to the driven gear according to the output torque.

In a third aspect, an embodiment of the present application provides an electric vehicle, including: a processor and a memory communicatively connected with the processor; the memory stores computer execution instructions; the processor executes the computer execution instructions stored in the memory to implement the electric-machinery control method for the electric vehicle according to the first aspect.

In a fourth aspect, an embodiment of the present application provides a computer-readable storage medium, where the computer-readable storage medium stores computer execution instructions, and when the computer execution instructions are executed by a processor, the electric-machinery control method for the electric vehicle according to the first aspect is implemented.

In a fifth aspect, an embodiment of the present application provides a computer program product, including a computer program, where when the computer program is executed by a processor, the electric-machinery control method for the electric vehicle according to the first aspect is implemented.

The embodiments of the present application provide the electric vehicle and the electric-machinery control method therefor, the apparatus and the storage medium. By analyzing the dynamic process when the meshing direction of the driving gear of the electric machinery changes, and in combination with the characteristics of high-precision measurement for the position and rotational speed of the driving gear of the electric machinery and rapid torque adjustment of the electric machinery, when the direction of the output torque of the electric machinery is detected to be about to change, the driving-gear is controlled to perform the active gear-approaching operation, so that the speed difference when the driving gear and the driven gear re-contact after disengagement is reduced, thereby reducing or even eliminating vibration and noise between the driving gear and the driven gear caused by an inertia impact. In addition, in the present application, there is no need to change the original hardware of the electric vehicle or add a new sensor, and the gear-approaching control can be realized only by calculating the wheel-end rotational speed, the driving-gear rotational speed of the electric machinery and the backlash. At the same time, in the present application, the restriction of the electric machinery on the descending slope or ascending slope of the output torque when the direction of the output torque is about to change can be released to the greatest extent, so that the output torque of the electric machinery can follow the operation and expectation of a user, and the problems of a sense of acceleration after releasing the throttle or a poor response of the electric vehicle when stepping on the throttle due to the restriction on the descending slope or ascending slope of the output torque of the electric machinery in the related technology can be avoided.

BRIEF DESCRIPTION OF DRAWINGS

In order to describe the technical solutions in embodiments of the present application or in the related technology more clearly, the drawings needed in the description of the embodiments or the related technology will be briefly introduced below. Obviously, the drawings in the following description are some embodiments of the present application. For those skilled in the art, other drawings can be obtained based on these drawings without paying creative effort.

DESCRIPTION OF EMBODIMENTS

Figure 1:
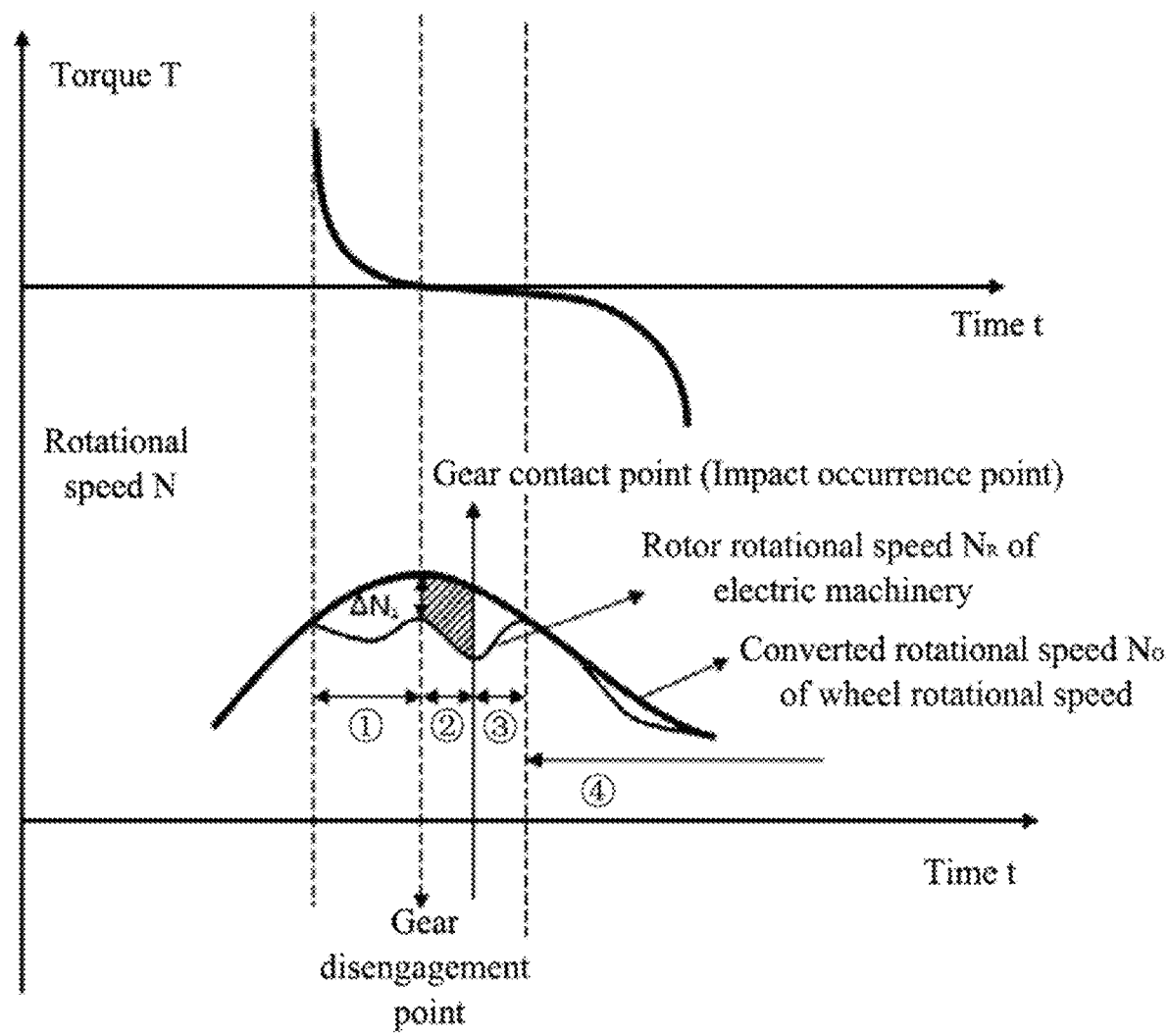
FIG. 1 is a schematic diagram of curves of a torque filtering method provided in the related technology.

In order to make the purposes, technical solutions and advantages of embodiments of the present application clearer, the technical solutions in the embodiments of the present application will be described clearly and completely in conjunction with the accompanying drawings. Obviously, the described embodiments are a part of the embodiments of the present application, but not all of the embodiments. Based on the embodiments in the present application, all other embodiments made by those skilled in the art under the inspiration of the embodiments belong to the protection scope of the present application.

The terms "first", "second", "third", "fourth" and the like (if any) in the description, claims and the above accompanying drawings of the present application are used to distinguish similar objects, and are not necessarily used to describe a specific order or sequence. It should be understood that the term used in this manner can be interchanged under appropriate circumstances, so that the embodiments of the present application described herein can be implemented in other orders than those illustrated or described herein. Furthermore, the terms "including" and "having" and any variations thereof are intended to cover non-exclusive inclusion. For example, processes, methods, systems, products or devices that include a series of steps or units are not necessarily limited to those steps or units explicitly listed, but may include other steps or units not explicitly listed or inherent to such processes, methods, products or devices.

First of all, the terms involved in the present application are explained in the following.

Torque: a special moment of force that makes an object rotates. A torque of an electric machinery is an output torque of the electric machinery.

Backlash: a gap between gear surfaces when a pair of gears are engaged. The backlash is a necessary parameter for smooth operation of gear meshing.

Relative deformation: a deformation of a non-rigid material when being stressed, including but not limited to torsion and offset, etc.

In the related technology provided in the Background, there exist at least the following technical problems.

With the increasingly stringent control on carbon emissions in countries all over the world, a date table for peak carbon dioxide emissions and carbon neutrality has been proposed, the time table for a ban on the sale of fuel vehicles is also planned, and in the meantime, new energy vehicles, i.e., electric vehicles are vigorously encouraged and supported. Judging from the current expanding trend of new energy application scope, the research and development, production and application scale of electric vehicles will increase at a high speed. A driving process of an electric vehicle is realized by controlling an output torque of an electric machinery according to a target torque determined by a vehicle controller or an electric-machinery controller. When the torque of the electric machinery changes between a positive torque and a negative torque, that is, a direction of the output torque of the electric machinery changes, a gear meshing direction of the electric machinery changes, and the stress direction is inconsistent, which will lead to a gear rattle, thus generating vibration and noise that users can obviously perceive and affecting driving comfort. In addition, the gear rattle may also cause damage to transmission mechanisms such as gears or splines.

In view of the above problems, in the related technology, when the output torque of the electric machinery is changed between the positive torque and the negative torque, the output torque is processed by a filtering processing method to reduce the vibration and noise. The filtering method may be a torque smoothing processing method. As shown in FIG. 1, taking a process of the output torque of the electric machinery changing from the positive torque to the negative torque as an example, a speed difference between a rotational speed of a driving gear and a rotational speed of a driven gear in a process of crossing a backlash by the driving gear is integrated in time, which is the shadow area in the figure, and this shadow area is a backlash value. In FIG. 1, a relative movement of the driving gear and the driven gear can be divided into four stages, namely ①, ②, ③ and ④ in FIG. 1, in which, stage ① is a stage of positive torque reduction and elastic pressure release; stage ② is a gear-approaching process of the driving gear; stage ③ is a process of contact and compression between the driving gear and the driven gear; and stage ④ is a stage of electric-machinery negative torque increase and elastic pressure compression. $\Delta N_1$ in FIG. 1 can be used to indicate a speed differential value between a converted rotational speed of a wheel end and the rotational speed of the driving gear at a moment that the driving gear and the driven gear disengage.

In the above-mentioned related technology, there exist the following problems. 1) By performing smoothing processing on the output torque, the driving gear slowly passes through the backlash by means of small torque output or zero torque output, which leads to a long time consumption for the driving gear to pass through the backlash and a long time consumption for changing between the positive torque and negative torque, so that a user has a driving experience that an output torque response of the electric machinery is discontinuous and interrupted, and thus perceives that the power output is delayed, resulting in a poor driving experience. 2) The driving gear contacts the driven gear at the maximum value of rotational speed difference, and an inertial impact and collision noise will still be generated, thus the improvement on the vibration and noise is not obvious. 3) A torque slope of the driving gear and the driven gear in the stage of elastic pressure release is too large, so $\Delta N_1$ is relatively large, which results in that an initial speed of the driving gear passing through the backlash is rather large, leading to a large speed difference between the driving gear and the driven gear when they re-contact, and thus to a serious impact and continuous jitter of the electric vehicle. Therefore, a decline or rise of the torque slope in the stage of elastic pressure release is restricted, which leads to the acceleration of the electric vehicle after the user releases the throttle, or the electric vehicle does not accelerate when the user steps on the throttle, resulting in a poor dynamic response of the electric vehicle.

The present application provides an electric-machinery control method for an electric vehicle. By analyzing a dynamic process of a driving gear of the electric machinery in a transmission system when a meshing direction changes, and in combination with characteristics of high-precision measurement for a position and rotational speed of the driving gear of the electric machinery and rapid torque adjustment of the electric machinery, when a direction of an output torque of the electric machinery is detected to change, the driving gear is controlled to perform a gear-approaching operation, so that a speed difference when the driving gear and a driven gear re-contact after disengagement is reduced, thereby reducing or even eliminating the vibration and noise between the driving gear and the driven gear caused by an inertial impact.

Figure 2:
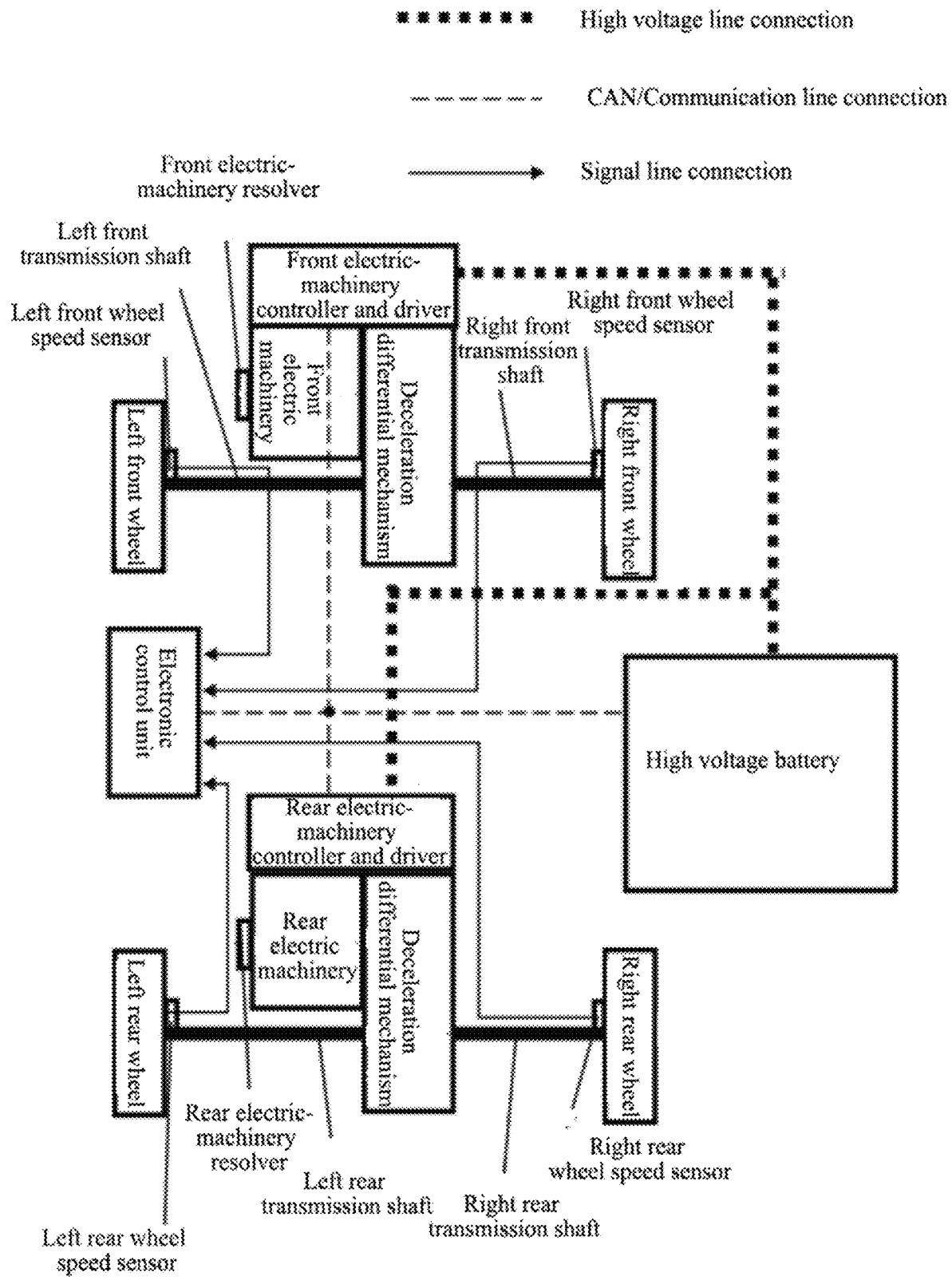
FIG. 2 is a schematic structural diagram of an electric vehicle provided by an embodiment of the present application.

In an embodiment, the electric-machinery control method for the electric vehicle can be applied in an application scenario. FIG. 2 is a schematic structural diagram of an electric vehicle provided by an embodiment of the present application. As shown in FIG. 2, the electric vehicle may include an electronic control unit, a left front wheel, a left front wheel speed sensor, a left front transmission shaft, a front electric-machinery resolver, a front electric machinery, a front electric-machinery controller and driver, a deceleration differential mechanism of the front electric machinery, a right front transmission shaft, a right front wheel speed sensor, a right front wheel, a high voltage battery, a left rear wheel, a left rear wheel speed sensor, a rear electric-machinery resolver, a rear electric machinery, a rear electric-machinery controller and driver, a deceleration differential mechanism of the rear electric machinery, a left rear transmission shaft, a right rear transmission shaft, a right rear wheel speed sensor and a right rear wheel.

In the above scenario, an output torque of the front electric machinery is transmitted to the left front wheel and the right front wheel through the deceleration differential mechanism of the front electric machinery. An output torque of the rear electric machinery is transmitted to the left rear wheel and the right rear wheel through the deceleration differential mechanism of the rear electric machinery. Then wheel speeds of the corresponding wheels are collected through the left front wheel speed sensor, the right front wheel speed sensor, the left rear wheel speed sensor and the right rear wheel speed sensor respectively. Speed values detected by the left front wheel speed sensor, the right front wheel speed sensor, the left rear wheel speed sensor and the right rear wheel speed sensor are all collected and processed by the ECU. Based on the obtained wheel speeds, the ECU determines whether torque directions of the output torques of the front electric machinery and the rear electric machinery have changed, and when the torque directions have changed, controls the driving gear to perform a gear-approaching operation, thus realizing an active control of the rotational speed of the driving gear, which can reduce or even avoid the problems of the large initial speed and the long time consumption when the driving gear passes through the backlash. Thus, the problems of the power output delay, the vibration and noise can be reduced or even avoided.

In conjunction with the above scenario, the technical solutions of the electric-machinery control method for the electric vehicle provided by the present application will be described in detail through several specific embodiments.

Figure 3:
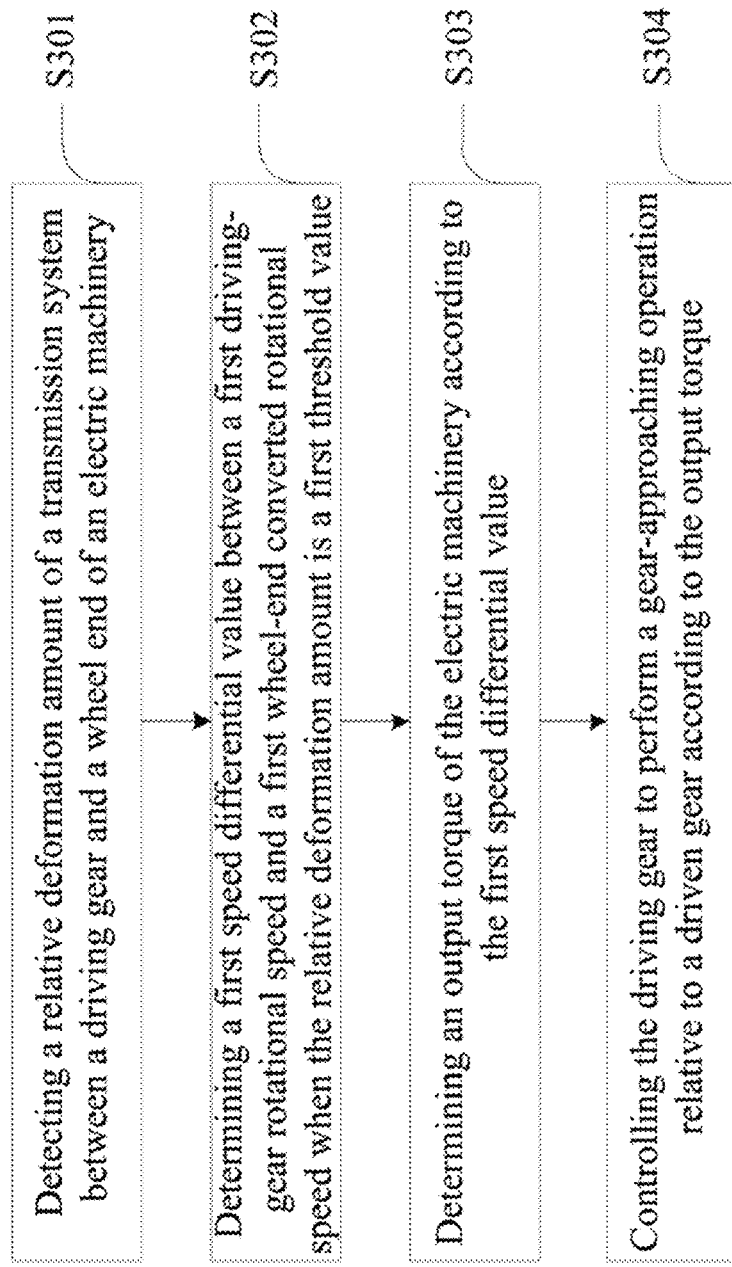
FIG. 3 is a flowchart of an electric-machinery control method for an electric vehicle provided by an embodiment of the present application.

The present application provides an electric-machinery control method for an electric vehicle. FIG. 3 is a flowchart of an electric-machinery control method for an electric vehicle provided by an embodiment of the present application. As shown in FIG. 3, the method includes the following steps.

S301: detecting a relative deformation amount of a transmission system between a driving gear and a wheel end of an electric machinery.

In this step, when a direction of an output torque of the electric machinery is about to change, it can be determined whether a meshing direction of the driving gear of the electric machinery and a driven gear of the transmission system is about to change. That is, when the direction of the output torque of the electric machinery changes, it means that the driving gear and the driven gear will disengage, that is, an elastic force between the driving gear and the driven gear will be released, so that the elastic force is reduced and the relative deformation amount of the transmission system between the driving gear and the wheel end is also reduced.

In an embodiment, the meshing direction between the driving gear of the electric machinery and the driven gear can be continuously detected during operation of the electric machinery, and the relative deformation amount of the transmission system between the driving gear and the wheel end can be continuously calculated, so that the relative deformation amount of the transmission system between the driving gear and the wheel end can be determined when the direction of the output torque of the electric machinery is detected to be about to change.

In an embodiment, a relative deformation of the transmission system between the driving gear and the wheel end may include a gear deformation and a shaft deformation.

S302: Determining a first speed differential value between a first driving-gear rotational speed and a first wheel-end converted rotational speed when the relative deformation amount is a first threshold value.

Figure 4:
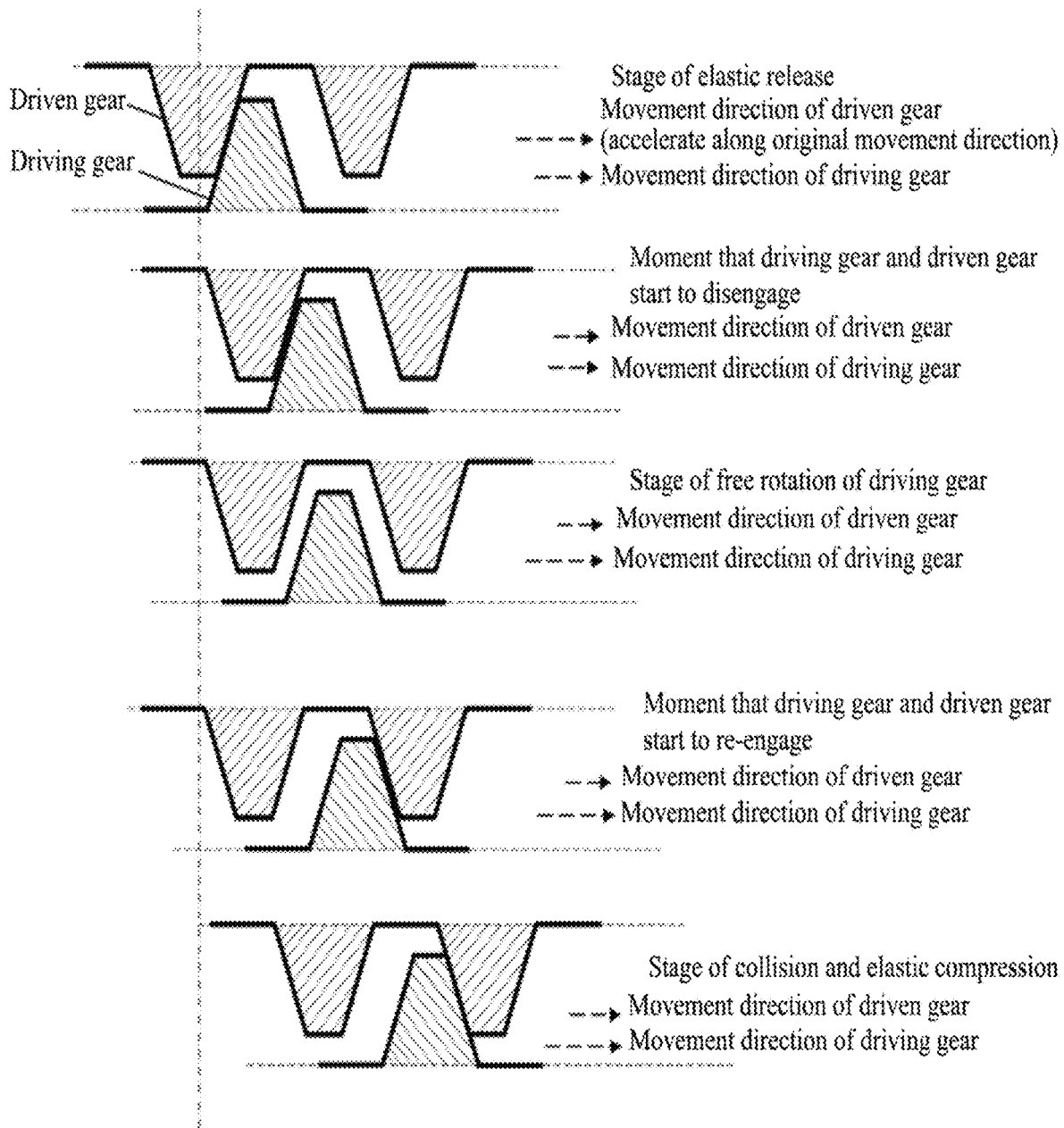
FIG. 4 is a schematic diagram of a movement process of a driving gear and a driven gear provided by an embodiment of the present application.

In this step, the relative deformation amount being the first threshold value is used to indicate that the driving gear and the driven gear of the transmission system start to disengage, the first driving-gear rotational speed is a rotational speed of the driving gear at a disengagement moment that the driving gear and the driven gear disengage, and the first wheel-end converted rotational speed is a rotational speed obtained by performing a speed ratio conversion on a rotational speed of the wheel end of the electric vehicle at the disengagement moment. The relative deformation amount being the first threshold can be that the relative deformation amount is equal to zero, and this moment is the disengagement moment that the driving gear and the driven gear start to disengage. A process of disengagement and re-contact between the driving gear and the driven gear can be as shown in FIG. 4, which is a schematic diagram of a movement process of a driving gear and a driven gear provided by an embodiment of the present application. In FIG. 4, the movement process can be a movement decomposition process between the driving gear and the driven gear after a fixed coordinate system is converted into a rotating coordinate system through a coordinate transformation (Park's Transformation), where a frequency of the rotating coordinate system is obtained from wheel speed conversion (the wheel speed is relatively stable, and a relatively stable coordinate system frequency can be obtained). A relative movement between the driving gear and the driven gear can be equivalent to the following six stages or moments: a stage of elastic release, a moment that the driving gear and driven gear start to disengage, a stage of free rotation of the driving gear, a moment that the driving gear and driven gear start to re-engage, a moment that the driving gear and driven gear start to contact, and a stage of elastic compression.

In an embodiment, the start of disengagement between the driving gear and the driven gear can be determined in the following manner: an elastic deformation between the driving gear and the driven gear is in a recovery process, and an amount of relative deformation recovery is equal to an elastic deformation amount.

In an embodiment, when the relative deformation amount is the first threshold, that is, when the driving gear and the driven gear start to disengage, a speed differential value between the first driving-gear rotational speed and the first wheel-end converted rotational speed at this moment can be determined and this speed differential value is denoted as the first speed differential value, so as to determine the output torque required by the electric machinery according to the first speed differential value.

S303: Determining an output torque of the electric machinery according to the first speed differential value.

Figure 5:
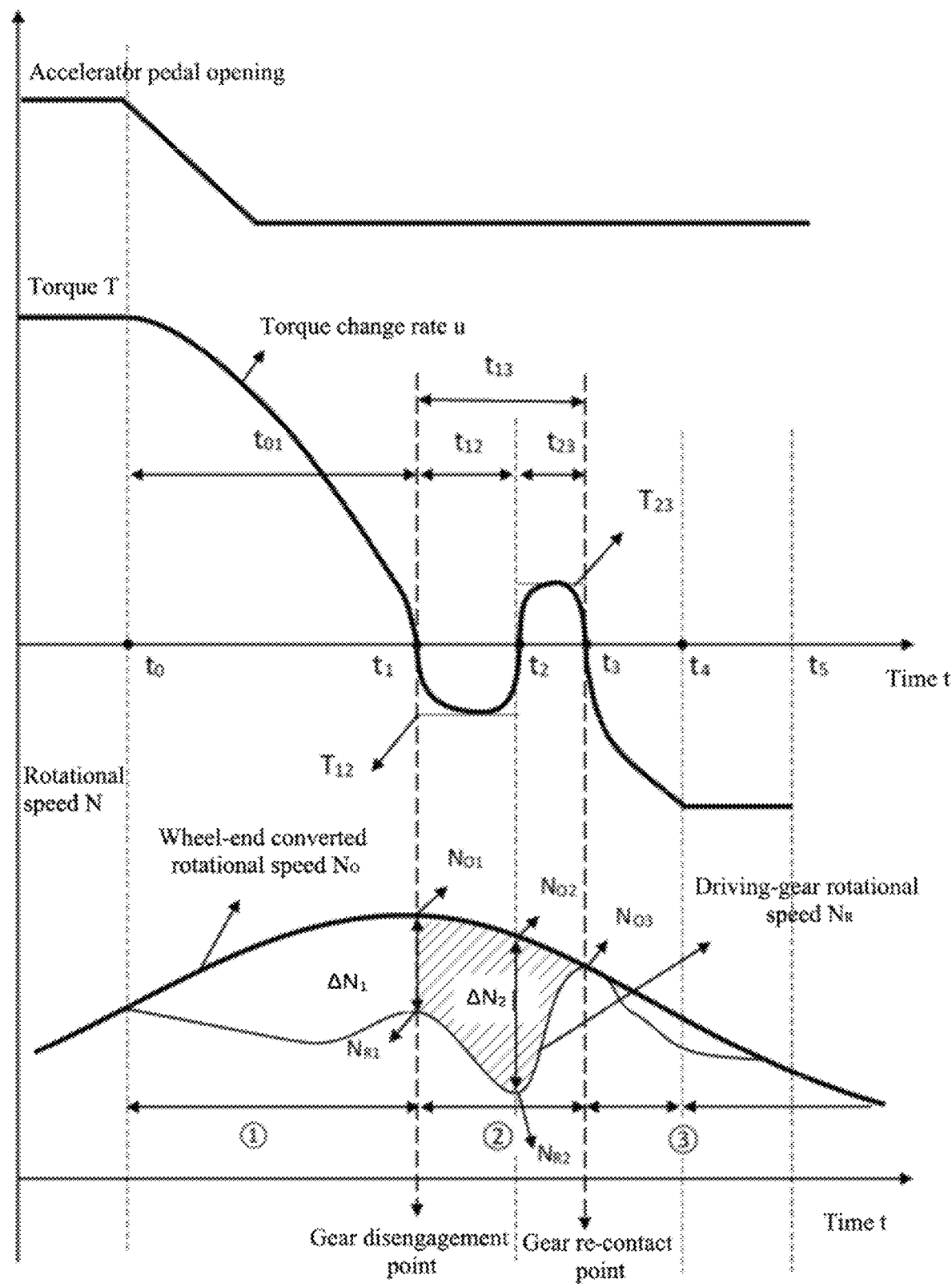
FIG. 5 is a schematic diagram of curves of gear-approaching control for a driving gear provided by an embodiment of the present application.

In this step, after the first speed differential value is determined, the output torque of the electric machinery can be calculated and obtained by the first speed differential value, as shown in FIG. 5, which is a schematic diagram of curves of gear-approaching control for a driving gear provided by an embodiment of the present application. In FIG. 5, taking the output torque of the electric machinery changing from a positive torque to a negative torque as an example, the relative movement of the driving gear and the driven gear can be decomposed into three stages, among which, stage ① can be a stage of positive torque reduction and elastic release, stage ② can be a stage of gear-approaching of the driving gear, and stage 3 can be a stage of negative torque increase and elastic compression. In FIG. 5:

u can be used to represent a torque change rate;

$T_{12}$ can be used to represent a first torque required for active control of gear-approaching of the driving gear, and its functions are: accelerating a rotor (the driving gear) of the electric machinery so that an electric-machinery shaft quickly crosses a gear gap area;

$T_{23}$ can be used to represent a second torque required for active control of the gear-approaching of the driving gear, and its functions are: reducing a rotational speed difference when meshing surfaces of gears contact, thus reducing an inertia impact caused by the rotational speed difference;

$T_{34}$ can be used to represent a transition torque after the end of active control of the gear-approaching, that is, a torque transitioning from a torque under the gear-approaching control to a stable torque;

$T_{45}$ can be used to represent a stable torque, that is, the output torque of the electric machinery at this moment is equal to a required torque of a driver (or a torque required by an accelerator pedal);

$t_0$ can be used to represent a moment that the output torque of the electric machinery starts to decrease when a user releases the throttle;

$t_1$ can be used to represent a moment that the driving gear and the driven gear start to disengage;

$t_2$ can be used to represent an action cut-off moment of the first torque $T_{12}$, at which the rotational speed of the driving gear changes from acceleration to deceleration, which can be a preset time point;

$t_3$ can be used to represent an action cut-off moment of the second torque $T_{23}$, that is, a moment that the driving gear and the driven gear re-contact;

$t_4$ can be used to represent a moment that the output torque of the electric machinery reaches a stable torque;

$t_5$ can be used to represent a last moment that the output torque of the electric machinery keeps stable at the stable torque;

$t_{01}$ can be used to represent a time duration from the time when the user releases the throttle to the time when the driving gear and the driven gear start to disengage;

$t_{12}$ can be used to represent an action duration of the first torque $T_{12}$;

$t_{23}$ can be used to represent an action duration of the second torque $T_{23}$;

$t_{13}$ can be used to represent total time of $t_{12}+t_{23}$, that is, an action duration of actively controlling the driving gear to perform the gear-approaching;

$t_{34}$ can be used to represent an action duration of torque $T_{34}$, that is, duration time of the transition torque;

$t_{45}$ can be used to represent an action duration of torque $T_{45}$, that is, duration time after the output torque of the electric machinery reaches a stable torque;

$N_O$ can be used to represent a rotational speed obtained by performing a speed ratio conversion on the rotational speed of the wheel end, which is referred to as a wheel-end converted rotational speed for short;

$N_{O1}$ can be used to represent a wheel-end converted rotational speed at time $t_1$;

$N_{O2}$ can be used to represent a wheel-end converted rotational speed at time $t_2$;

$N_{O3}$ can be used to represent a wheel-end converted rotational speed at time $t_3$;

$N_R$ can be used to represent a rotor rotational speed of the electric machinery, that is, a driving-gear rotational speed;

$N_{R1}$ can be used to represent a driving-gear rotational speed at the end of $t_{01}$, that is, a driving-gear rotational speed at moment $t_1$;

$N_{R2}$ can be used to represent a driving-gear rotational speed at the end of $t_{12}$, that is, a driving-gear rotational speed at moment $t_2$;

$\Delta N_1$ can be used to represent a speed difference between $N_{O1}$ and $N_{R1}$ at moment $t_1$, that is, a rotational speed difference between the wheel-end converted rotational speed and the driving-gear rotational speed at the moment that the driving gear and the driven gear disengage;

$\Delta N_2$ can be used to represent a speed difference between $N_{O2}$ and $N_{R2}$ at moment $t_2$, that is, a rotational speed difference between the wheel-end converted rotational speed and the driving-gear rotational speed at the action cut-off moment of the first torque $T_{12}$.

In an embodiment, the speed difference between the driving gear and the driven gear in the process of the driving gear passing through the backlash can be integrated in time, that is, the shadow area in FIG. 5, and this shadow area is a backlash value. By determining the first speed differential value, that is, $\Delta N\_1$, the output torque of the electric machinery, that is, T12 and T23, is calculated.

In an embodiment, in the stage ① of FIG. 5, an integral range of the elastic release deformation can be as follows: from the moment that the user releases the throttle followed by the driven gear disengaging, until the output torque of the electric machinery is zero or the integral value of the elastic release deformation is equal to a preset value of elastic deformation. Among them, the preset value of elastic deformation can be expressed by a mapping table of output torque and elastic release deformation. When the cumulative integral value of the elastic release deformation reaches the preset value of elastic deformation, it is considered that the elastic release deformation is over. A method for presetting the mapping table can be as follows: given different locked-rotor torques of the electric machinery on the whole vehicle or transmission system assembly in a static state, measure rotation angles of the electric-machinery shaft under the locked-rotor torques.

In the stage ② of FIG. 5, an integral range of the backlash can be: from the end of elastic release deformation to the time when the backlash integration value reaches a preset backlash value S or a self-learning backlash value S.

In the stage ③ of FIG. 5, an integral range of elastic compression deformation can be: from the end of backlash integration to re-engagement of the driving gear and the driven gear.

In an embodiment, an integral calculation formula can be expressed as follows:

$$L = \sum \Delta \omega$$
$$\Delta \omega = \Delta N \times 2\pi/60.$$

When a sampling frequency is $\Delta t$:

$$L_t = L_{t-1} + \Delta \omega \times \Delta t.$$

Among them, L can be used to represent the integral of a relative position difference between the driving gear and the driven gear, and both the elastic deformation integral and the backlash integral can be represented by this value, in the unit of rad; $\Delta N$ can be used to represent the speed difference between the driving gear and the driven gear, in the unit of round per minute, rpm; w can be used to represent the speed difference between the driving gear and the driven gear after unit conversion, in the unit of rad/s.

S304: Controlling the driving gear to perform a gear-approaching operation relative to the driven gear according to the output torque.

In this step, as the active control on the rotational speed of the driving gear is realized by controlling the output torque of the electric machinery, the driving gear can be controlled to perform the gear-approaching operation relative to the driven gear by controlling the output torque of the electric machinery, so as to reduce the speed difference between the driving gear and the driven gear when the gears contact, and thus to reduce the inertia impact when the gears contact, thereby eliminating vibration and noise.

In the electric-machinery control method for the electric vehicle provided by this embodiment, the elastic deformation when the output torque of the electric machinery changes is introduced and calculated, and the relative initial speed caused by the elastic deformation is identified, so that a corresponding control strategy for the output torque of the electric machinery is implemented according to the initial speed to control the driving gear to actively perform the gear-approaching operation, thus effectively reducing or even avoiding or solving the inertia impact when the gears contact, thereby eliminating the vibration and noise. In addition, due to the active control for the driving gear to perform the gear-approaching, the contact and compression stages in the torque smoothing scheme can be eliminated, the time for the driving gear to pass through the backlash is shortened, and the change process of the gear meshing surfaces is shortened, that is, the changing time between the positive torque and the negative torque is reduced, the torque response is improved, and the driving performance is improved.

In an embodiment, determining the output torque of the electric machinery according to the first speed differential value includes: determining a product of the first speed differential value and the first time duration as a first product, where the first time duration is a time duration from the disengagement time to a contact moment that the driving gear and the driven gear contact; if the first product is less than a preset backlash value, determining that the output torque includes a first torque and a second torque, where a direction of the first torque and a direction of the second torque are opposite, the first torque is a torque required within a time interval from the disengagement moment to a transition moment that the electric machinery transitions between an acceleration state and a deceleration state, and the second torque is a torque required within a time interval from the transition moment to the contact moment.

In this solution, when determining the output torque of the electric machinery according to the first speed differential value, the product of the first speed differential value and the first time duration, that is, $\Delta N_1 \times (t_{12}+t_{23})$, can be determined first. When $\Delta N_1 \times (t_{12}+t_{23}) < 2S$ (where S can be used to represent a default backlash value, and the default backlash value being 2S is the optimal solution), the direction of the first torque $T_{12}$ and the direction of the second torque $T_{23}$ calculated by the first speed differential value are opposite, and an output torque curve can be as shown in FIG. 5.

In an embodiment, by determining the output torque of the electric machinery, the active control can be performed on the rotational speed of the driving gear, that is, a torque control of decelerating first and then accelerating (or accelerating first and then decelerating, depending on the changing direction of the output torque of the electric machinery), which reduces the time consumption taken for the driving gear to cross the backlash and alleviates or even avoids the problem of slow dynamic response. By controlling the rotational speed of the driving gear, the rotational speed difference between the driving gear and the driven gear when they re-contact can be reduced. Under an ideal condition, the rotational speed difference can be reduced to zero, and the vibration and noise can be completely eliminated.

In an embodiment, the first torque and the second torque are determined in the following manner: at the transition moment, determining a second speed differential value between a current driving-gear rotational speed and a second wheel-end converted rotational speed according to the preset backlash value, the first speed differential value and the first time duration, where the second wheel-end converted rotational speed is a rotational speed obtained by performing a speed ratio conversion on the rotational speed of the wheel end of the electric vehicle at the transition moment; determining a second driving-gear rotational speed according to the second speed differential value and the second wheel-end converted rotational speed, where the second driving-gear rotational speed is a rotational speed of the driving gear at the transition moment; determining the first torque according to the second driving-gear rotational speed, the first driving-gear rotational speed, a time duration between the disengagement moment and the transition moment, and a sliding friction of the driving gear at the second driving-gear rotational speed; determining the second torque according to the second driving-gear rotational speed, a third driving-gear rotational speed, a time duration between the transition moment and the contact moment, and a sliding friction of the driving gear at the third driving-gear rotational speed, where the third driving-gear rotational speed is a rotational speed of the driving gear at the contact moment.

Figure 6:
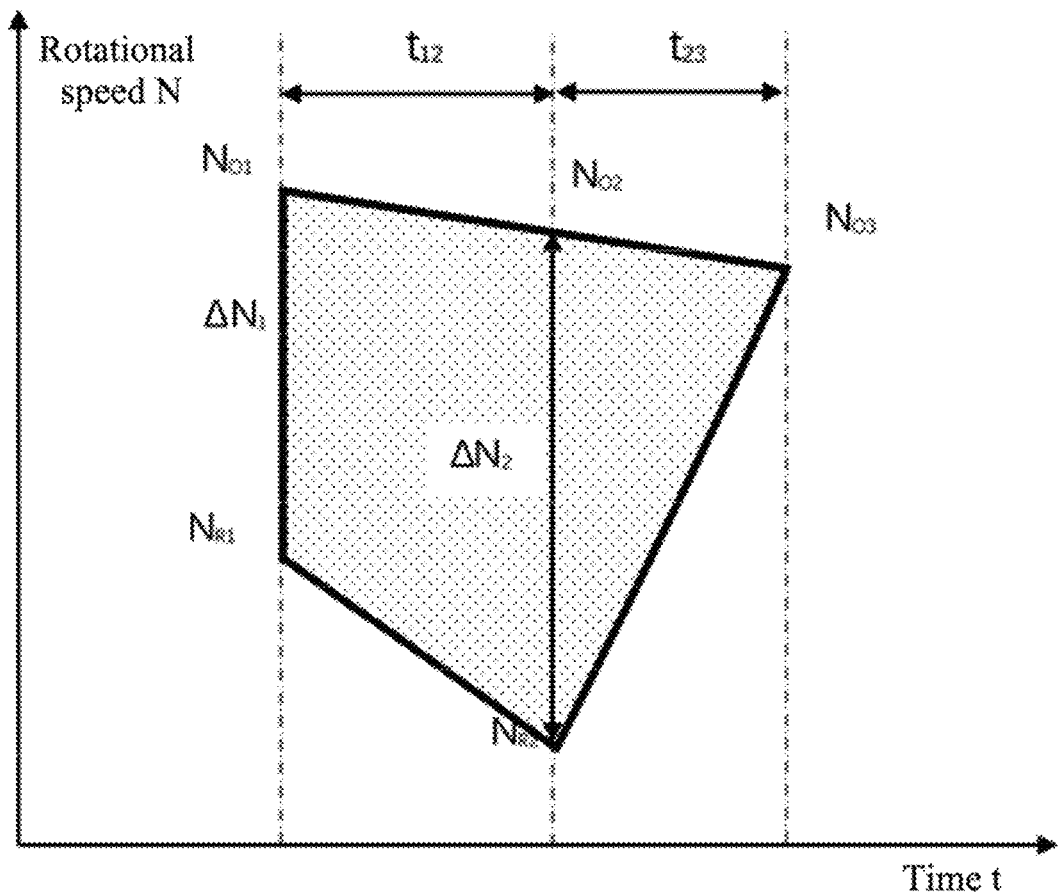
FIG. 6 is a schematic diagram of a first embodiment of performing geometric-model simplification processing on a shadow area in FIG. 5 provided by an embodiment of the present application.

In this solution, geometric-model simplification processing can be performed on the shadow area in FIG. 5. As shown in FIG. 6, the output torque of the electric machinery can be determined with a simplified model shown in FIG. 6.

According to the simplified model, when $N_{O1}$, $N_{R1}$, $t_{12}$ and $t_{23}$ are determined, $N_{O2}$ and $N_{O3}$ are determined values, and the time component of $N_{R2}$ is a determined value. The area enclosed by $N_{O1}$, $N_{O3}$, $N_{R1}$ and $N_{R2}$, that is, backlash value S, is also a determined value.

According to the above conditions, the velocity components of $\Delta N_2$ and $N_{R2}$ can be obtained. Then a velocity change rate $a_{12}$ can be obtained by differentiating the line segment $N_{R1}N_{R2}$, and a velocity change rate $a_{23}$ can be obtained by differentiating the line segment $N_{R2}N_{O3}$. According to the velocity change rates $a_{12}$ and $a_{23}$, the first torque $T_{12}$ and the second torque $T_{23}$ can be determined, which can be expressed by formulas as follows:

$$2S = \Delta N_1 \times t_{12} + \Delta N_2 \times (t_{12} + t_{23})$$

$$\Delta N_2 = (2S - \Delta N_1 \times t_{12})/(t_{12} + t_{23})$$

$$N_{R2} = N_{O2} - \Delta N_2 = N_{O2} - (2S - \Delta N_1 \times t_{12})/(t_{12} + t_{23})$$

$$a_{12} = (N_{R2} - N_{R1})/t_{12}$$

$$a_{23} = (N_{O3} - N_{R2})/t_{23}.$$

Given the moment of inertia of the electric machinery rotor, the first torque $T_{12}$ and the second torque $T_{23}$ can be obtained according to the moment of inertia I of the electric machinery rotor, which can be expressed by formulas as follows:

$$T_{12} = I \times a_{12} + T_F$$

$$T_{23} = I \times a_{23} + T_F.$$

Among them, one or more tables can be determined according to different driving modes of the electric vehicle, and mapping relationships of the rotational speed of the driving gear (or a vehicle speed) with $t_{12}$ and $t_{23}$ can be stored in the tables, thus $t_{12}$ and $t_{23}$ can be obtained by querying the tables. $T_F$ can be used to represent the sliding friction of driving gear rotation at the current driving-gear rotational speed and temperature, which can be obtained by bench test.

In an embodiment, the wheel-end converted rotational speed $N_O$ can be determined by a following formula:

$$N_O = N * i.$$

A vehicle speed prediction formula:

$$V = V_1 + a \times \Delta t =$$
$$V_1 + a_F \times \Delta t - \sin\theta \times g \times \Delta t + F/m \times \Delta t = (N_{O1} + a_O \times \Delta t) \times 2\pi r/K/i$$
$$K = N_1 \times 2\pi r/V_1.$$

A vehicle speed acceleration formula:

$$a = a_F - \sin\theta \times g + F/m \text{ then}$$
$$a_F \times \Delta t - \sin\theta \times g \times \Delta t + F/m \times \Delta t = a_O \times \Delta t \times 2\pi r/K/i.$$

A wheel speed acceleration formula:

$$a_O = a/(\Delta t \times 2\pi r \times K) = (-a_F - \sin\theta \times g + F/m)/(2\pi r/K/i).$$

A wheel speed prediction formula:

$$N_{O\Delta t} = N_{O1} + a_O \times \Delta t = N_{O1} + (-a_F - \sin\theta \times g + F/m) \times \Delta t/(2\pi r/K/i).$$

Among them, K can be used to represent a tire slip coefficient; N can be used to represent a wheel speed of a wheel; $N_1$ can be used to represent the wheel speed of the wheel at a certain moment; $N_O$ can be used to represent the wheel-end converted rotational speed; V can be used to represent a speed of the electric vehicle; $V_1$ can be used to represent the speed of the electric vehicle at a certain moment; a can be used to represent an acceleration of the vehicle speed; F can be used to represent a torque at the wheel end, and when the driving gear passes through the backlash, F=0; $a_F$ can be used to represent a deceleration caused by a sliding resistance of the whole vehicle (wind resistance+wheel-end friction+mechanical friction of the transmission system), which can be obtained by a sliding curve; $a_O$ can be used to represent an acceleration of the wheel speed; r can be used to represent the radius of the wheel; θ can be used to represent a slope; i can be used to represent a speed ratio between the wheel and the electric machinery rotor; λt can be used to represent a duration of a certain time period; g can be used to represent the acceleration of gravity; m can be used to represent the mass of the electric vehicle.

In an embodiment, in addition to determining the output torque of the electric machinery through determining t12 and t23 to control the driving gear to complete the gear-approaching operation, the gear-approaching action of the driving gear can also be completed by given values of T12 and T23. One or more tables can be determined according to different driving modes, and mapping relationships of the rotational speed of the driving gear (or the vehicle speed) with T12 and T23 are stored in the tables, that is, T12 and T23 can be obtained by querying the tables. The time corresponding to T12 and T23 can be determined to complete the gear-approaching action of the driving gear, which can be expressed as follows with formulas:

$$a_{12} = 1/T_{12}$$

$$a_{23} = 1/T_{23}$$

$$2S = \Delta N_1 \times t_{12} + \Delta N_2 \times (t_{12} + t_{23})$$

$$\Delta N_2 = \Delta N_1 - a_{13} \times t_{12} + a_{12} \times t_{12}$$

$$\Delta N_1 + a_{12} \times t_{12} = a_{23} \times t_{23} + a_{13} \times (t12 + t23)$$

$$t_{23} = (\Delta N_1 + a_{12} \times t_{12} - a_{13} \times t_{12})/(a_{13} + a_{23})$$

$$2S = \Delta N_1 \times t_{12} +$$

$$(\Delta N_1 - a_{13} \times t_{12} + a_{12} \times t_{12}) \times (t_{12} + (\Delta N_1 + a_{12} \times t_{12} - a_{13} \times t_{12})/(a_{13} + a_{23})).$$

Among them, $a_{13}$ can be used to represent a speed change rate obtained by differentiating the line segment $N_{O1}N_{O3}$.

Through the above formulas, the time $t_{12}$ corresponding to the first torque $T_{12}$ and the time $t_{23}$ corresponding to the second torque $T_{23}$ can be determined, that is, the whole gear-approaching process can be determined.

In an embodiment, when the area enclosed by NO1, NO3, NR1, NR2, that is, the backlash value S, is determined, NO1 and NR1 are determined, and the whole gear-approaching process can also be determined by determining any two values of T12, T23, t12, t23 and t13.

In an embodiment, by actively controlling the rotational speed of the driving gear, that is, adopting the torque control of decelerating first and then accelerating (or accelerating first and then decelerating, depending on the direction in which the output torque of the electric machinery is about to change), the time consumption for the driving gear to cross the backlash is reduced, and the problem of slow dynamic response is alleviated or even avoided. By controlling the rotational speed of the driving gear, the rotational speed difference between the driving gear and the driven gear when they re-contact can be reduced. Under an ideal condition, the rotational speed difference can be reduced to zero, and the vibration and noise can be completely eliminated.

In an embodiment, determining the output torque of the electric machinery according to the first speed differential value further includes: if the first product is greater than or equal to the preset backlash value, determining a product of the first speed differential value and a second time duration as a second product, where the second time duration is a time duration from the disengagement moment to the transition moment; if the second product is less than the preset backlash value, determining that the output torque includes the first torque and the second torque, where the direction of the first torque and the direction of the second torque are the same.

In this solution, when the calculated first product is greater than or equal to the preset backlash value 2S, it is necessary to determine the product of the first speed differential value and the second time duration, that is, when $\Delta N_1 \times (t_{12}+t_{23}) \geq 2S$, it is necessary to calculate $\Delta N_1 \times t_{12}$.

Figure 7:
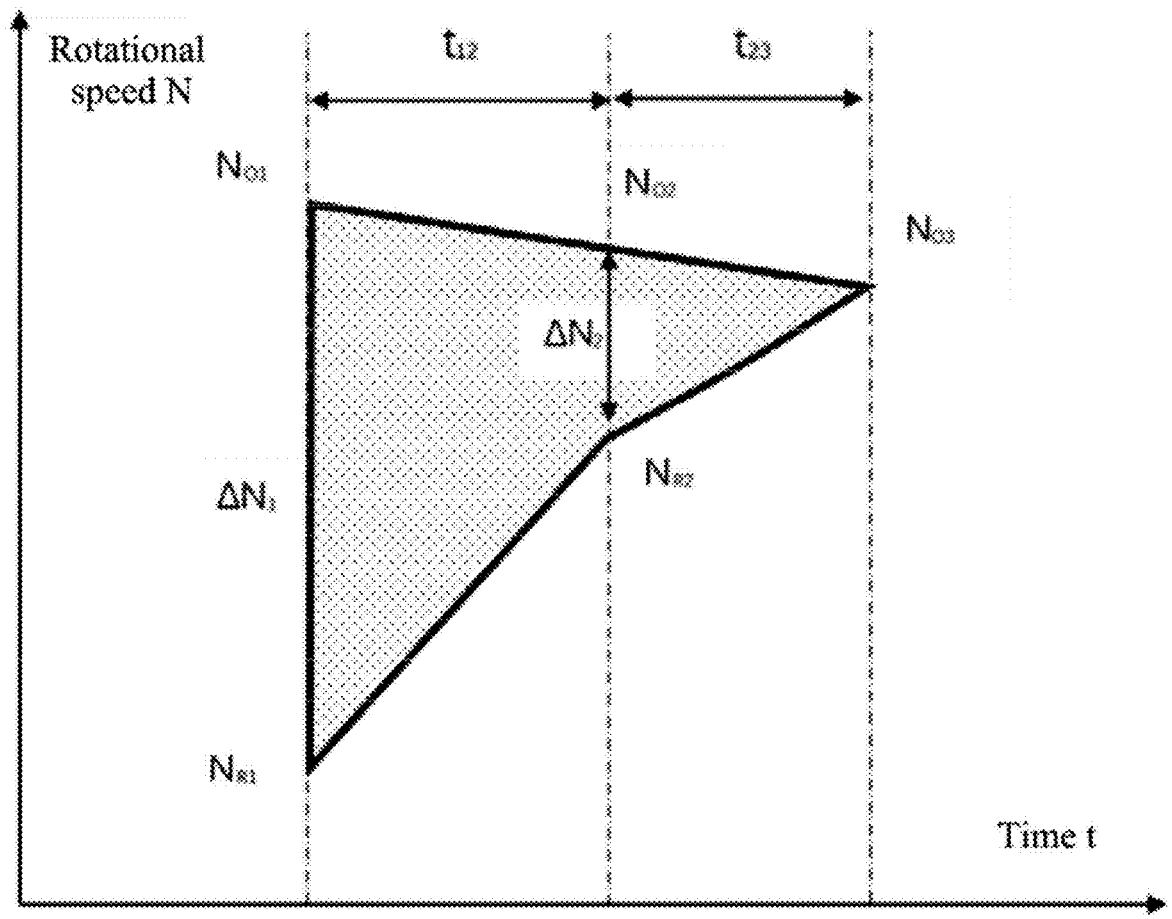
FIG. 7 is a schematic diagram of a second embodiment of performing geometric-model simplification processing on the shadow area in FIG. 5 provided by an embodiment of the present application.

In an embodiment, if $\Delta N\_1 \times t\_12 < 2S$, then the geometric-model simplification processing can be performed on the shadow area in FIG. 5 to obtain a simplified model as shown in FIG. 7. At this time, the formulas for determining the first torque T12 and the second torque T23 are the same as those used when $\Delta N\_1 \times (t\_12+t\_23) < 2S$, but when $\Delta N\_1 \times t\_12 < 2S$, the directions of the first torque T12 and the second torque T23 are the same, and an output torque curve can be as shown in FIG. 8.

Figure 8:
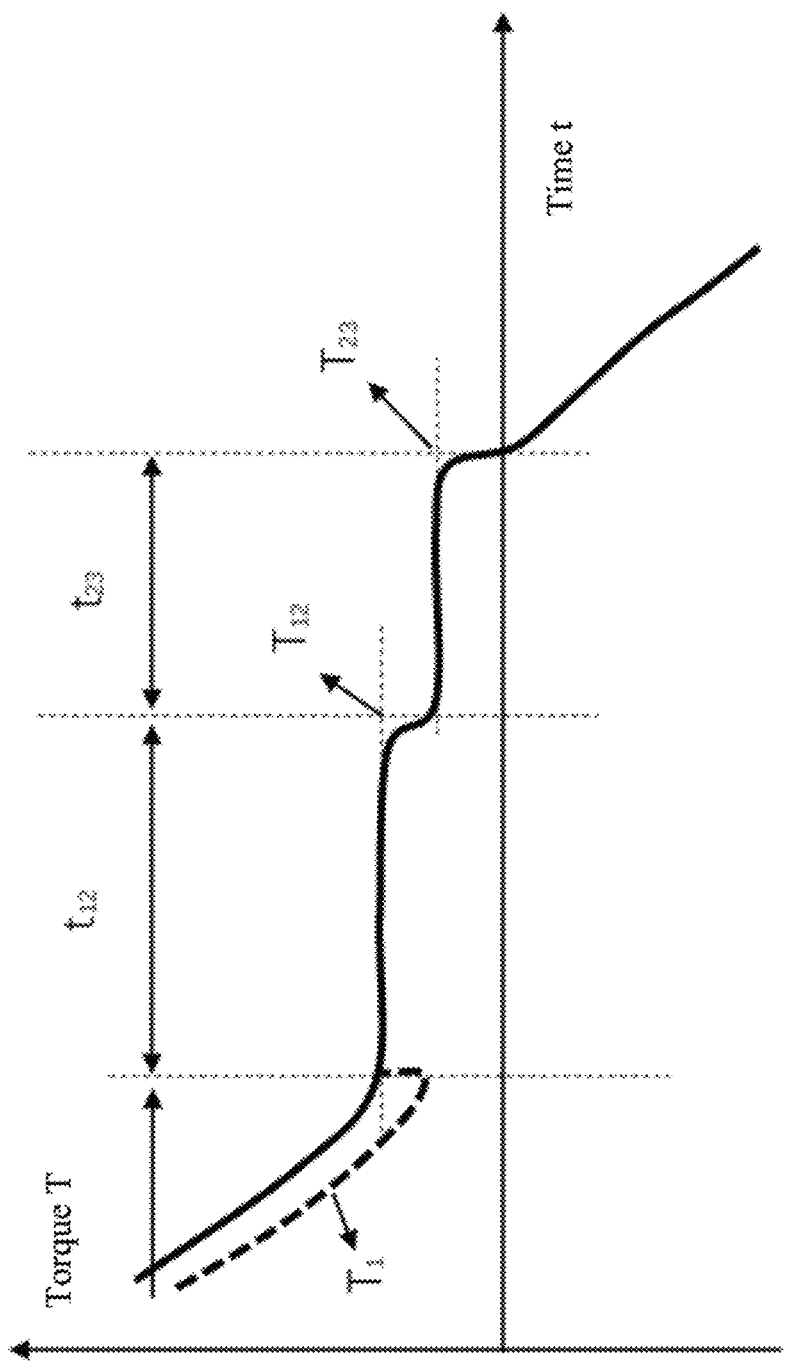
FIG. 8 is a schematic diagram of curves of an output torque of an electric machinery corresponding to FIG. 7 provided by an embodiment of the present application.

In an embodiment, in FIG. 8, the dotted line T1 can be used to represent a possible torque curve in a stage of output torque reduction, and the torque curve depends on the torque change rate u, the disengagement moment t1 when the driving gear and the driven gear disengage, and the initial speed difference $\Delta N\_1$ when the driving gear and the driven gear disengage, where u can be used to represent an average slope of the torque reduction from a moment that the user releases the throttle and the output torque starts to reduce, to a moment that the driving gear and the driven gear start to disengage (t0 to t1), that is, a torque reduction slope, which can also be referred as a torque change rate.

In an embodiment, by actively controlling the rotational speed of the driving gear, that is, adopting the torque control of decelerating first and then accelerating (or accelerating first and then decelerating, depending on the changing direction of the output torque of the electric machinery), the time consumption for the driving gear to cross the backlash is reduced, and the problem of slow dynamic response is alleviated or even avoided. By controlling the rotational speed of the driving gear, the rotational speed difference between the driving gear and the driven gear when they re-contact can be reduced. Under an ideal condition, the rotational speed difference can be reduced to zero, and the vibration and noise can be completely eliminated.

In an embodiment, determining the output torque of the electric machinery according to the first speed differential value further includes: if the second product is greater than or equal to the preset backlash value, determining a third wheel-end converted rotational speed at a target moment, where the third wheel-end converted rotational speed is a rotational speed obtained by performing a speed ratio conversion on the rotational speed of the wheel end of the electric vehicle at the target moment, and the target moment is a moment that the driving gear and the driven gear re-contact within the second time duration; determining a third torque according to the third wheel-end converted rotational speed, the first driving-gear rotational speed, and a time duration between the disengagement moment and the target moment, where the third torque is a torque required within a time interval from the disengagement moment to the target moment, and the output torque includes the third torque.

Figure 9:
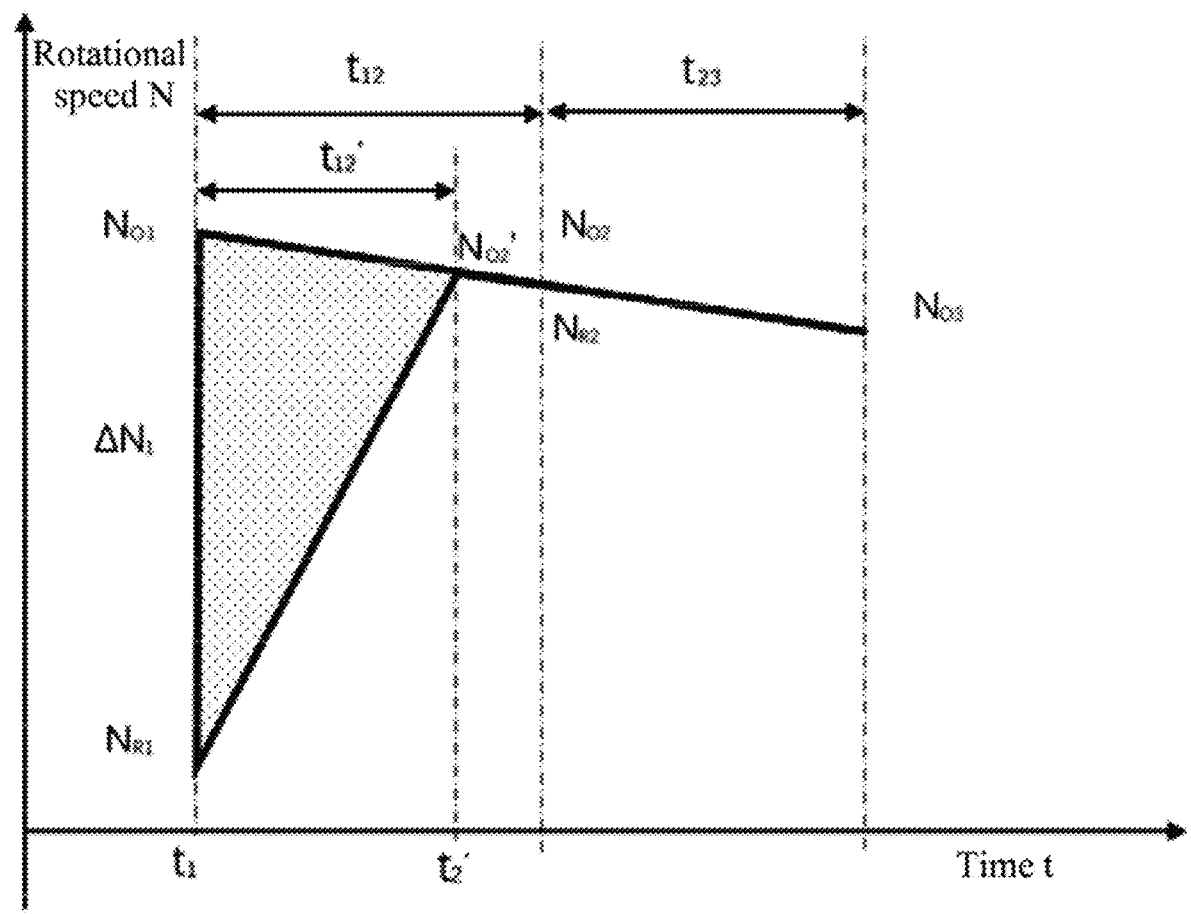
FIG. 9 is a schematic diagram of a third embodiment of performing geometric-model simplification processing on the shadow area in FIG. 5 provided by an embodiment of the present application.

In this solution, if the second product is greater than or equal to the preset backlash value, that is, $\Delta N_1 \times t_{12} \geq 2S$, the geometric-model simplification processing can be performed on the shadow area in FIG. 5, to obtain a simplified model as shown in FIG. 9. At this time, it is only necessary to calculate the required torque within the time duration from $t_1$ to $t_{2'}$, where $t_{2'}$ is the target moment, that is, a moment that the driving gear and the driven gear re-contact within the time duration from $t_1$ to $t_{2'}$.

In an embodiment, when $\Delta N_1 \times t_{12} \geq 2S$, determining the output torque (the third torque) of the electric machinery can be expressed by the following formulas:

$$\Delta N_1 \times t_{12'} = 2S$$
$$t_{12'} = 2S/\Delta N_1$$
$$N_{O2'} = N_{O1} - a_{13} \times t_{12'}$$
$$a_{12'} = (N_{O2'} - N_{R1})/t_{12'}$$
$$T_{12'} = I \times a_{12'}.$$

Among them, $t_{12'}$ can be used to represent the time duration from $t_1$ to $t_{2'}$; $N_{O2'}$ can be used to represent a wheel-end converted rotational speed when the driving gear and the driven gear re-contact at moment $t_{2'}$; $a_{12'}$ can be used to represent a speed change rate obtained by differentiating the line segment $N_{O1}N_{O2'}$; $T_{12'}$ can be used to represent the third torque.

Figure 10:
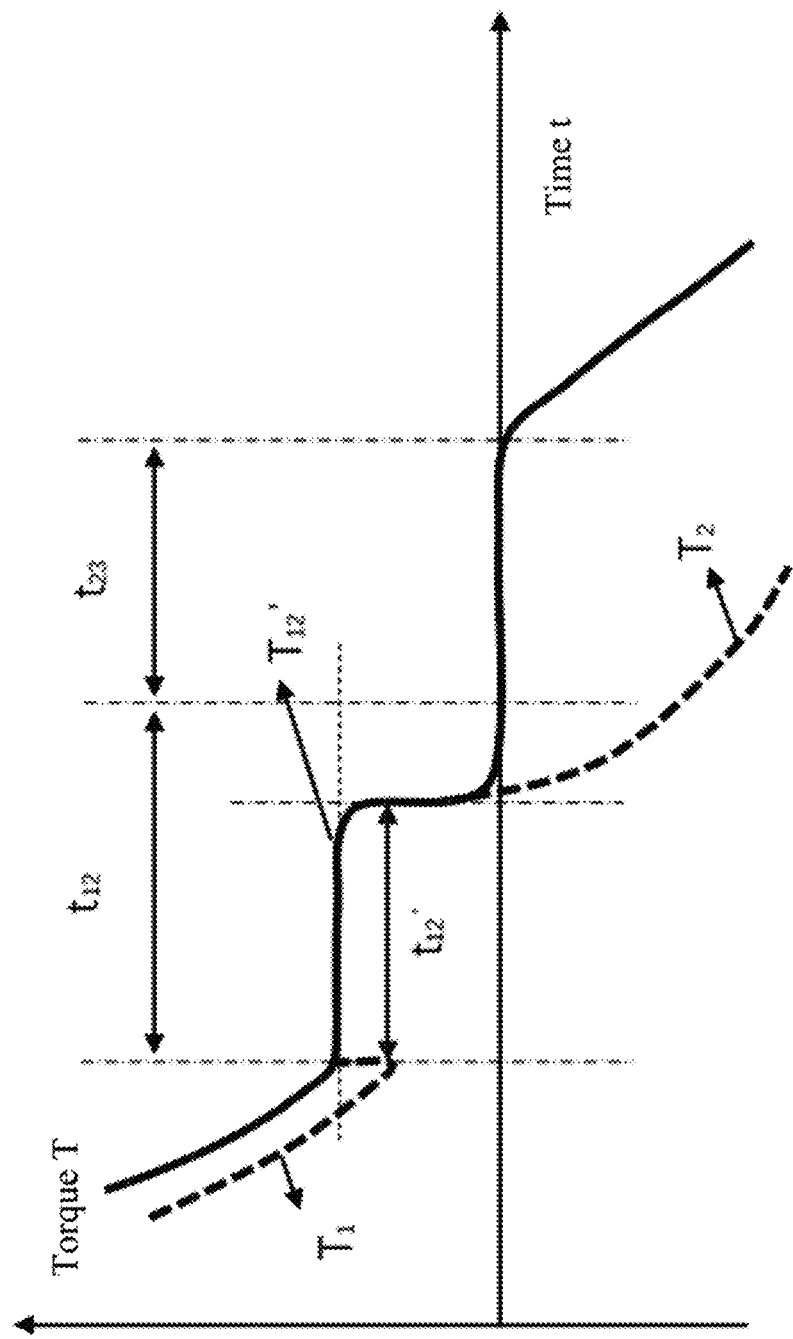
FIG. 10 is a schematic diagram of curves of an output torque of an electric machinery corresponding to FIG. 9 provided by an embodiment of the present application.

In an embodiment, when $\Delta N_1 \times t_{12} \geq 2S$, an output torque curve can be as shown in FIG. 10. In FIG. 10, the dotted line $T_1$ can be used to represent a possible torque curve in the stage of output torque reduction, and the torque curve depends on the torque change rate u, the disengagement moment $t_1$ that the driving gear and the driven gear disengage, and the initial speed difference $\Delta N_1$ when the driving gear and the driven gear disengage. The dotted line $T_2$ can be used to represent a selectable torque curve after the time duration of $t_{12'}$.

In an embodiment, by actively controlling the rotational speed of the driving gear, that is, adopting the torque control of decelerating first and then accelerating (or accelerating first and then decelerating, depending on the changing direction of the output torque of the electric machinery), the time consumption for the driving gear to cross the backlash is reduced, and the problem of slow dynamic response is alleviated or even avoided. By controlling the rotational speed of the driving gear, the rotational speed difference between the driving gear and the driven gear when they re-contact can be reduced. Under an ideal condition, the rotational speed difference can be reduced to zero, and the vibration and noise can be completely eliminated.

In an embodiment, detecting the relative deformation amount of the transmission system between the driving gear and the wheel end of the electric machinery includes: determining whether the direction of the output torque of the electric machinery is about to change; when the direction of output torque is about to change, determining whether the meshing direction of the driving gear and the driven gear of the electric machinery is about to change; when the meshing direction of the driving gear and the driven gear is about to change, determining the relative deformation amount.

In this solution, the torque transmitted by the transmission system between the driving gear and the wheel will lead to a relative deformation of the transmission system between the driving gear and the wheel end, and an elastic force generated by the deformation of the transmission system between the driving gear and the wheel end will lead to a relative speed difference between the rotational speed of the driving gear and the wheel-end converted rotational speed during the changing process of the output torque. By identifying the relative speed difference, and implementing different control strategies for the output torque for different relative speed differences, the problems that "the vehicle still has an acceleration after the throttle is loosened or the vehicle does not accelerate when stepping on the throttle, resulting in a poor dynamic response of the vehicle" existed in the related technology can be effectively alleviated or even avoided. As this solution allows a large torque slope in the stage of elastic release, a rapid change between the positive torque and the negative torque can be realized, thus optimizing the dynamic response of the electric vehicle.

In an embodiment, whether the direction of the output torque of the electric machinery is about to change or not can be determined. The direction of the output torque of the electric machinery being about to change may include various situations such as the direction of the output torque changing from positive to negative, from negative to positive, from zero to positive, from zero to negative, etc. When the direction of output torque is about to change, it can be determined whether the meshing direction of the driving gear and driven gear of the electric machinery is about to change, and when the meshing direction of the driving gear and the driven gear is about to change, the relative deformation amount of the transmission system between the driving gear and the wheel end of the electric machinery is determined.

In an embodiment, detecting the relative deformation amount of the transmission system between the driving gear and the wheel end of the electric machinery further includes: determining a third speed differential value between a current driving-gear rotational speed and a current driven-gear rotational speed upon detecting that the direction of the output torque of the electric machinery changes; determining a relative displacement of the driving gear and the driven gear according to the third speed differential value; determining the relative deformation amount according to the relative displacement.

In this solution, if the output torque changes, the third speed differential value between the rotational speed of the driving gear and the rotational speed of the driven gear can be calculated in real time during the subsequent movement of the driving gear and the driven gear. A speed differential value in each of a plurality of consecutive time periods can be determined. Then, the relative displacement of the driving gear and the driven gear can be calculated through the speed differential value in each time period and the time duration of the corresponding time period, so as to obtain the relative deformation amount of the driving gear and the driven gear.

In an embodiment, relative initial speeds of the driving gear caused by different relative deformation amount are different. Therefore, different control strategies for the output torque can be implemented for different initial speeds, so as to realize the rapid change between the positive torque and the negative torque and optimize the dynamic response of the electric vehicle.

In the electric-machinery control method for the electric vehicle provided by the present application, by performing the active control on the output torque of the electric machinery when the meshing direction of the driving gear and the driven gear changes, the time taken for the driving gear and the driven gear to re-contact is reduced, the changing between the positive torque and the negative torque is accelerated, the power output delay is shortened, and the drivability is optimized. Moreover, by performing the active control on the output torque of the electric machinery when the meshing direction of the driving gear and the driven gear changes, the speed difference when the driving gear contacts with the driven gear is eliminated, and the noise and impact caused by the inertial impact are eliminated. In addition, by applying the deceleration torque to reduce or eliminate the speed difference when the driving gear contacts with the driven gear, the torque slope in the stage of elastic release can be increased, and a rapid change between the positive torque and the negative torque is realized, so that the problems that the vehicle still has an acceleration after the throttle is loosened or the vehicle does not accelerate when stepping on the throttle can be alleviated or even avoided, and the dynamic response of the vehicle is optimized.

In an embodiment, the output torque of the vehicle can also be determined by a driving state of the vehicle. The driving state of the vehicle can be referred as a driving style or a driving mode, which refers to an acceleration characteristic or a deceleration characteristic of the vehicle when the user steps on the accelerator pedal or releases the accelerator pedal. Under different driving state settings, the vehicle has different driving states. In other words, a power unit of the vehicle has different torque output characteristics under different driving state settings, that is, a certain driving state is achieved by controlling the output torque. The driving states may include an economy state (ECO state), a comfort state (standard state), a sports state and a track state. In order to meet and adapt to the needs of users for different driving states when driving the vehicle, the vehicle can be equipped with a selection function for the driving states. Under different driving states, the power unit has different characteristics of torque output when stepping on the accelerator pedal or releasing the accelerator pedal, so as to meet the requirements that different driving states have different acceleration characteristics or deceleration characteristics for the vehicle. Compared with a comfort mode and an economy mode, in a sports mode, when the accelerator pedal is stepped on or released, the change rate of vehicle acceleration is greater, and the vehicle can achieve a greater acceleration or deceleration in the sports mode within the same time, or the vehicle can achieve a target acceleration or a target deceleration in shorter time.

In another related technology, in order to realize multiple driving states, a corresponding executive program (or logic) is usually set for each driving state, and after the user selects a certain driving state, a corresponding program is executed. However, this method determines that the selection of the driving state cannot be made by user's arbitrary setting, and the user can only choose and use among several preset driving states. At the same time, the number of the driving states cannot be preset as unlimited, otherwise it will bring high development cost and parts cost, and the development cycle will increase accordingly. In addition, even if a limited number of driving states are pre-installed, it will increase the research and development cost and the research and development time. However, for different users, or for the same user in different driving scenarios, there are different requirements for the acceleration response of the vehicle, thus, a limited number of driving states cannot meet the needs of users for the acceleration response of the vehicle. For example, in some cases, the acceleration response of the vehicle in the sports mode is more sensitive, but the acceleration response of the vehicle in the comfort mode is more sluggish. For an inappropriate acceleration response of the vehicle, the user need some time to learn and adapt to this driving mode or vehicle response, and this process will also lead to a poor user experience for vehicle drivability, as shown in FIG. 11.

Figure 11:
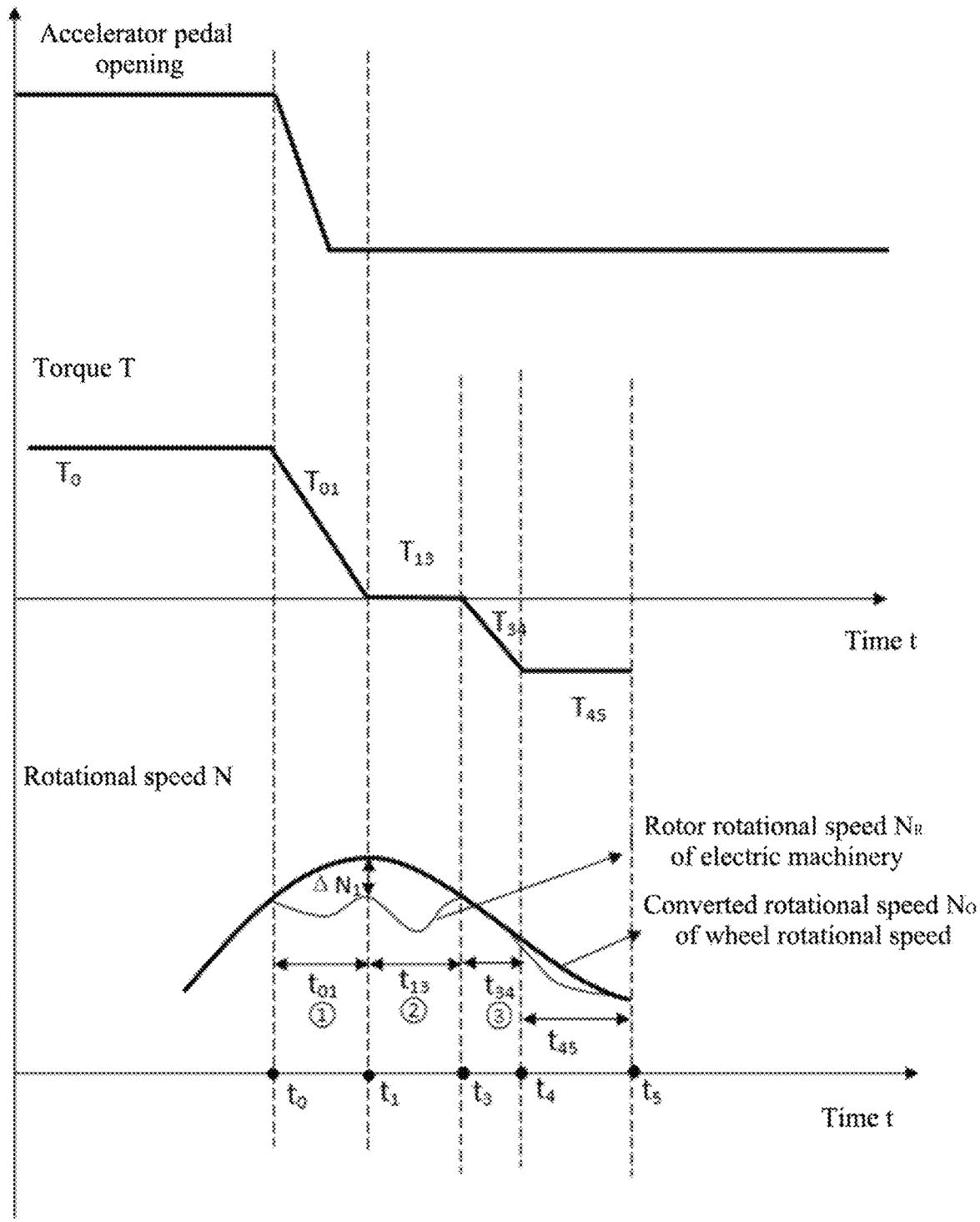
FIG. 11 is a schematic diagram of determining a driving state provided in the related technology.

FIG. 11 is a schematic diagram of determining a driving state provided in the related technology. In FIG. 11, taking releasing the accelerator pedal as an example, when the user changes from stabilizing the accelerator pedal to releasing the accelerator pedal, it can be divided into steady-state torque control and dynamic torque control. Among them, a steady-state torque can be used to represent a torque when the user stabilizes the accelerator pedal, that is, torque $T_0$ and torque $T_{45}$. When the driving state is changed, different driving states of steady-state driving can be realized by changing the magnitude of the steady-state torque. A dynamic torque can be used to represent a torque in a process from changing of an accelerator pedal opening to stabling of the torque, and the dynamic torque can be decomposed into three stages.

Stage ①: that is, a time interval of $t_{01}$, which is a torque reduction process, and this time interval corresponds to the torque $T_{01}$.

Stage ②: that is, a time interval of $t_{13}$, which is a gear-approaching process with zero torque or small torque, and this time interval corresponds to the torque $T_{13}$.

Stage ③: that is, a time interval of $t_{34}$, which is a torque increasing process, and this time interval corresponds to the torque $T_{34}$.

Among them, $\Delta N_1$ can be used to represent the rotational speed difference between the wheel-end converted rotational speed and the rotational speed of the driving gear when the driving gear disengages with the driven gear at moment $t_1$.

In this related technology, the driving state in the time interval of $t_{01}$ is determined by determining the torque change rate in the time interval of $t_{01}$. The driving state in the time interval of $t_{13}$ is determined by determining the torque magnitude in the time interval of $t_{13}$ and the time duration of the time interval $t_{13}$. The torque magnitude in the time interval of $t_{13}$, the time duration of the time interval $t_{13}$ and the torque change rate in the time interval of $t_{01}$ should be matched with each other, otherwise, it will lead to a relatively strong vehicle vibration, which will lead to a poor driving experience of the user. The driving state in the time interval of $t_{34}$ is determined by determining the torque change rate in the time interval of $t_{34}$. The torque change rate in the time interval of $t_{34}$ is required to be matched with the torque magnitude in the time interval of $t_{13}$, the time duration of the time interval $t_{13}$ and the torque change rate in the time interval of $t_{01}$, otherwise, it will also lead to a relatively strong vehicle vibration, which will lead to a poor driving experience of the user. Therefore, in the related technology, in each stage of the dynamic torque control, the accuracy requirement for controlling the torque magnitude and the time duration of the torque is high, and it is difficult to achieve the expected effect, which leads to problems such as great calibration difficulty, long calibration period and high research and development cost.

In the present application, the output torque can be controlled in real time according to driving state parameters input by the user, so that the user can choose a driving state of the vehicle between the allowed least-sensitive state and the allowed most-sensitive state according to his/her own preference or habit. Therefore, the driving state of the vehicle can be better matched with the driving habit of the user, and the driving experience of the user is improved. Moreover, the user can freely adjust the driving state, and the user can adapt the vehicle to the user's driving habit by adjusting the driving state, thus reducing the learning cost of the user. In addition, the real-time calculation of the output torque according to the driving state parameters input by the user can shorten the research and development cycle and reduce the research and development cost.

The technical solutions of determining the output torque of the vehicle through the driving state of the vehicle are described in detail in the following through several specific embodiments.

In an embodiment, determining the output torque of the electric machinery includes: obtaining driving state information corresponding to an adjusted target driving state in response to an adjustment operation for adjusting a driving state; performing conversion processing on the driving state information to obtain a digital signal; performing analysis processing on the digital signal to obtain a torque signal; determining the output torque according to the torque signal.

Figure 12:
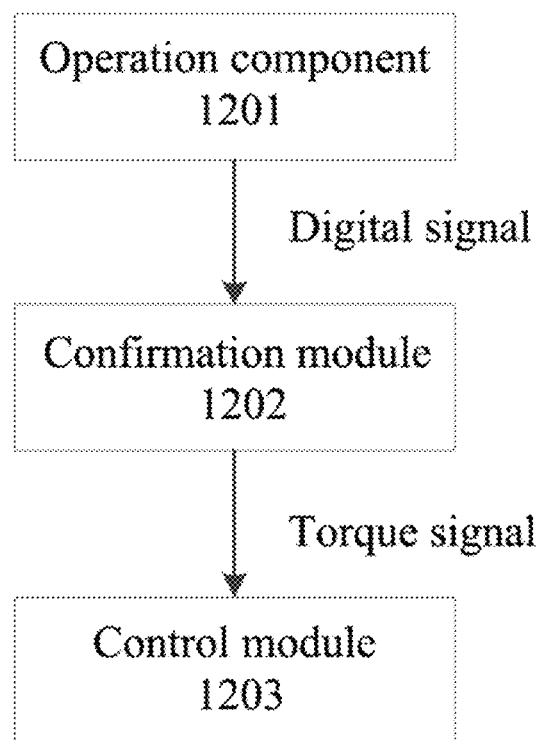
FIG. 12 is a schematic diagram of a driving state control apparatus provided by an embodiment of the present application.

In this solution, a driving state control apparatus can be provided, as shown in FIG. 12, which is a schematic diagram of a driving state control apparatus provided by an embodiment of the present application. In FIG. 12, the driving state control apparatus can include, but is not limited to, an operation component 1201, a confirmation module 1202 and a control module 1203. Specifically, the user adjusts the driving state to a desired target driving state by operating the operation component 1201. The operation component 1201 converts the driving state information corresponding to the user-adjusted target driving state into the digital signal and transmits it to the confirmation module 1202. After receiving the digital signal, the confirmation module 1202 calculates and obtains the torque signal of the real-time demand corresponding to the target driving state and transmits the torque signal to the control module 1203. The control module 1203 outputs a corresponding torque after receiving the torque signal.

In the above solution, the operation component 1201 can be a control unit including an operation element and a feedback element. By means of the operation component 1201, the adjustment operation of the user for the driving state can be responded to, and a result of the adjustment operation can be transmitted to the confirmation module 1202 and fed back to the user.

Among them, the operation element may include one or more of a tactile operation element (such as a switch, a rotary adjuster, a rotary pressing adjuster, a sliding adjuster, a trackball, a joystick, a touch panel, a touch screen, etc.), an acoustic detection and/or analysis and evaluation unit (such as a microphone, a voice recognition apparatus, a frequency analyzer, etc.), an eye tracking apparatus (such as a camera-based eye tracking apparatus), a non-contact position determination unit, a 3D position determination unit, a proximity sensor, a user identity (such as a driver, a co-driver, a passenger, etc.) recognition system, a gesture recognition apparatus, etc. For example, the operation element may be configured as a push switch and/or a rotary switch or as a touch input display. The operation component 1201 may preferably be arranged in the common operation range of the driver and the co-driver, and may be arranged in the operation range of the passenger in the back seat of the same vehicle.

The feedback element may include a signal conversion apparatus, which converts the driving state information corresponding to the target driving state input by the user into the digital signal (conversion processing can be carried out by duty ratio, proportion, grade, intensity, etc.), and transmits the digital signal to the confirmation module 1202. The feedback element may also include a visual element (such as a display screen, a light, etc.), a sound element, etc. The current driving state can be fed back to the user through animation, images, characters, sounds, light colors, light brightness, number of lights, etc.

In the above solution, the user can choose the driving state of the vehicle between the allowed least-sensitive state and the allowed most-sensitive state according to his/her own preference or habit, so that the driving state of the vehicle can be better matched with the driving habit of the user and the driving experience of the user can be improved.

In an embodiment, the digital signal represents different driving states of the electric vehicle through different numerical values, and performing the analysis processing on the digital signal to obtain the torque signal includes: determining the torque signal to be a first preset signal when the digital signal is a first numerical value; determining the torque signal to be a second preset signal when the digital signal is a second numerical value; determining the torque signal to be a target signal according to the first preset signal, the second preset signal and a first target numerical value when the digital signal is the first target numerical value; where the first numerical value is less than the second numerical value, the first target numerical value is greater than the first numerical value and less than the second numerical value, the first preset signal is a torque signal when a sensitivity corresponding to the driving state of the electric vehicle is the lowest, the second preset signal is a torque signal when the sensitivity corresponding to the driving state of the electric vehicle is the highest, and the target signal is a torque signal when the sensitivity corresponding to the driving state of the electric vehicle is between the highest sensitivity and the lowest sensitivity.

In this solution, after the confirmation module receives the digital signal transmitted by the operation component, the digital signal can be expressed in the form of numerical value in the confirmation module. For example, the digital signal can take any numerical value between 0 and 1. If the numerical value of the digital signal is A, then:

when A=0, it can be used to indicate that the driving state is in the least-sensitive state;

when A=1, it can be used to indicate that the driving state is in the most-sensitive state;

when 0<A<1, it can be used to indicate that the driving state is between the least-sensitive state and the most-sensitive state.

In the above solution, the first numerical value can be 0, and the first preset signal is a torque signal corresponding to the driving state in the least-sensitive state; the second numerical value can be 1, and the second preset signal is a torque signal corresponding to the driving state in the most-sensitive state; and the first target numerical value can be any numerical value between 0 and 1. As the output torque is calculated in real time according to the driving state input by the user, the research and development cycle can be shortened and the research and development cost can be reduced.

In an embodiment, when the torque signal is the target signal, determining the output torque according to the torque signal includes: acquiring a fourth torque corresponding to the first preset signal and a fifth torque corresponding to the second preset signal; determining a third product of the first target numerical value and the fifth torque; determining a first target differential value between a preset value and the first target numerical value, and determining a fourth product of the first target differential value and the fourth torque; determining the sum of the third product and the fourth product as the output torque.

In this solution, releasing the accelerator pedal is taken as an example (the same applied to stepping on the accelerator pedal, and the difference lies in that releasing the accelerator pedal is a control of torque reduction and stepping on the accelerator pedal is a control of torque increase).

Figure 13:
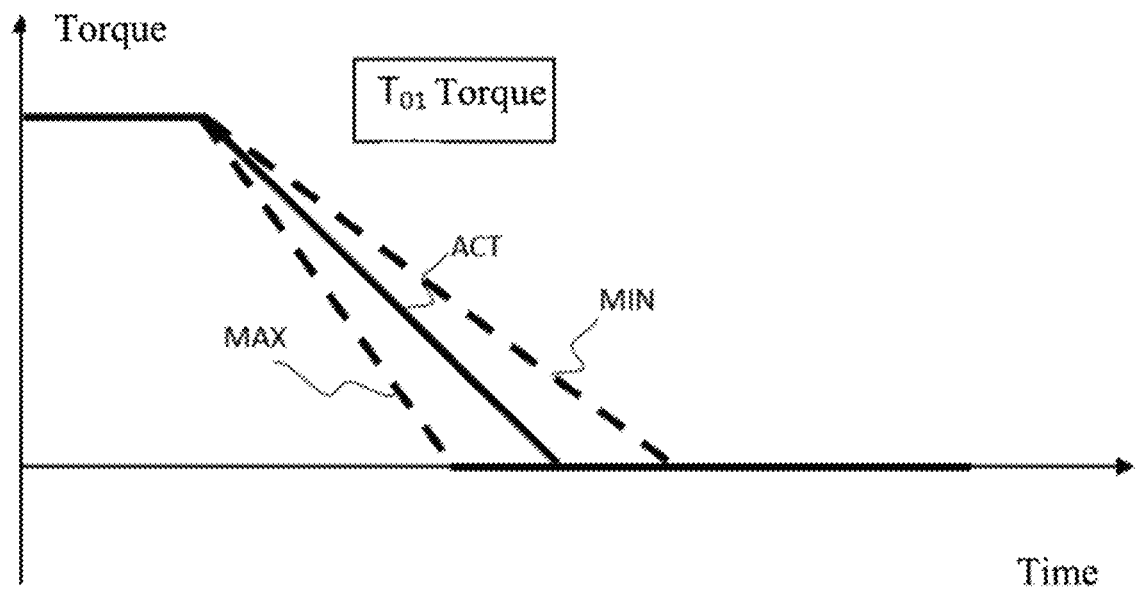
FIG. 13 is a schematic diagram of determining an output torque provided by an embodiment of the present application.

For the stage ① of the dynamic torque in FIG. 5, that is, the stage of torque reduction and elastic release, the driving state at this stage can be determined by controlling the change slope of torque $T_{01}$ in the time interval of $t_{01}$, as shown in FIG. 13.

FIG. 13 is a schematic diagram of determining an output torque provided by an embodiment of the present application. In FIG. 13, the MAX curve can be used to represent a torque curve when the driving state is in the most-sensitive state, that is, when A=1; the MIN curve can be used to represent a torque curve when the driving state is in the least-sensitive state, that is, when A=0; the ACT curve can be used to represent a torque curve when the driving state is between the least-sensitive state and the most-sensitive state, that is, when 0<A<1. The MAX curve and the MIN curve are preset curves.

In the stage ① of the dynamic torque, for 0<A<1, the output torque $T_{01}$_ACT can be expressed as follows:

$$T_0\_ACT = A * T_{01}\_MAX + (1 - A) * T_{01}\_MIN$$

where A can be used to represent a first target numerical value, which can be any numerical value between 0 and 1; $T_{01}$_MAX can be used to represent an output torque when the driving state is in the most-sensitive state, that is, when A=1, which is the fifth torque; $T_{01}$_MIN can be used to represent an output torque when the driving state is in the least-sensitive state, that is, when A=0, which is the fourth torque; and the preset value can be 1.

Figure 14:
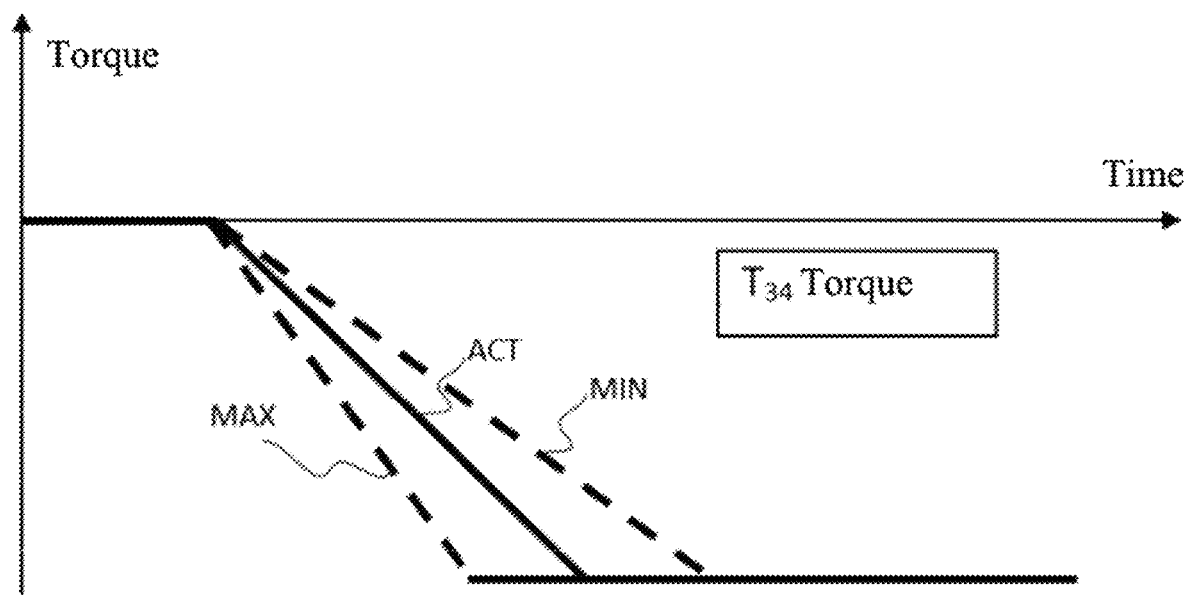
FIG. 14 is another schematic diagram of determining an output torque provided by an embodiment of the present application.

For the stage ③ of the dynamic torque in FIG. 5, that is, the stage of negative torque increase and elastic compression, the driving state at this stage is determined by controlling the change slope of torque $T_{34}$ in the time interval of $t_{34}$, as shown in FIG. 14.

FIG. 14 is another schematic diagram of determining an output torque provided by an embodiment of the present application. In FIG. 14, the MAX curve can be used to represent a torque curve when the driving state is in the most-sensitive state, that is, when A=1; the MIN curve can be used to represent a torque curve when the driving state is in the least-sensitive state, that is, when A=0; the ACT curve can be used to represent a torque curve when the driving state is between the least-sensitive stage and the most-sensitive stage, that is, when 0<A<1. The MAX curve and the MIN curve are preset curves.

In the stage ③ of the dynamic torque, for 0<A<1, the output torque $T_{34}$_ACT can be expressed as follows:

$$T_{34}\_ACT = A * T_{34}\_MAX + (1 - A) * T_{34}\_MIN$$

where $T_{34}$_MAX can be used to represent an output torque when the driving state is in the most-sensitive state, that is, when A=1, which is the fifth torque; $T_{34}$_MIN can be used to represent an output torque when the driving state is in the least-sensitive state, that is, when A=0, which is the fourth torque; the preset value can be 1.

Figure 15:
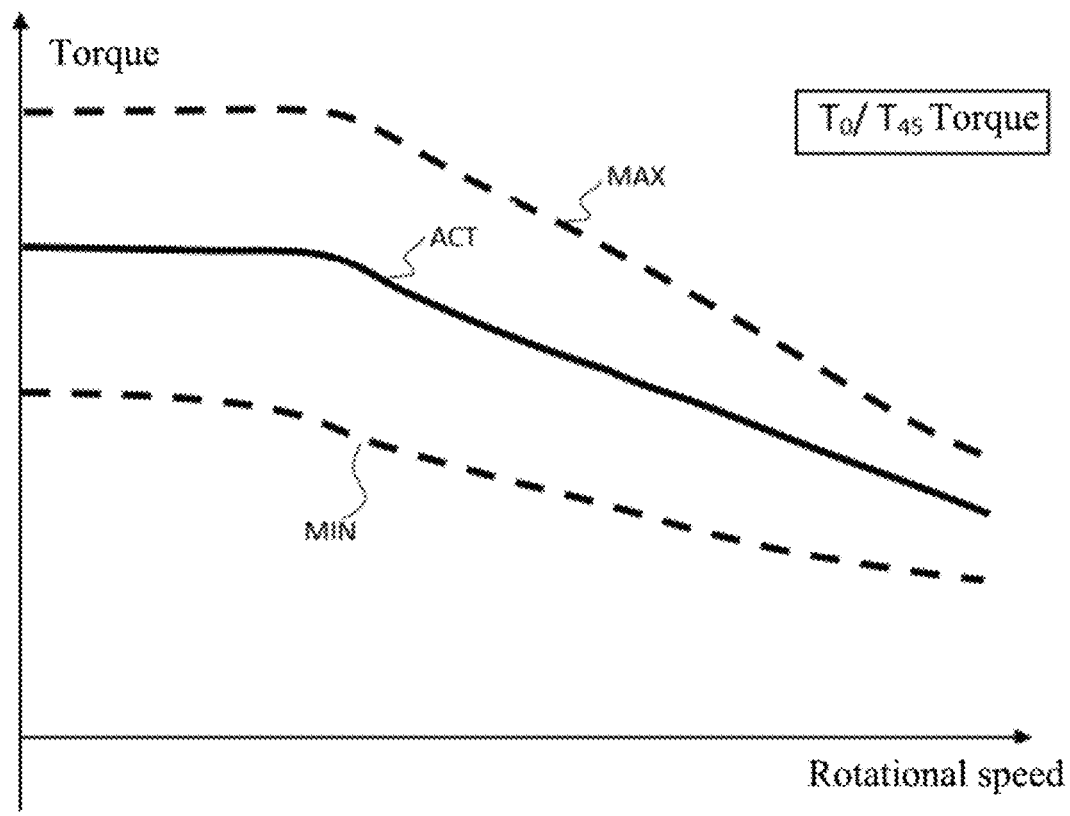
FIG. 15 is another schematic diagram of determining an output torque provided by an embodiment of the present application.

For the steady-state torque in FIG. 5, namely, torque $T_0$ and torque $T_{45}$, different driving states of steady-state driving can be realized by changing the magnitude of torque $T_0$ and torque $T_{45}$, as shown in FIG. 15.

FIG. 15 is another schematic diagram of determining an output torque provided by an embodiment of the present application. In FIG. 15, for a certain fixed accelerator pedal opening, the MAX curve can be used to represent the torque curve with this accelerator pedal opening when the driving state is in the most-sensitive state, that is, when A=1; the MIN curve can be used to represent the torque curve with this accelerator pedal opening when the driving state is in the least-sensitive state, that is, when A=0; the ACT curve can be used to represent the torque curve with this accelerator pedal opening when the driving state is between the least-sensitive state and the most-sensitive state, that is, when 0<A<1. The MAX curve and the MIN curve are preset curves.

For 0<A<1, the output torque T_ACT can be expressed as follows:

$$T\_ACT = A * T\_MAX + (1 - A) * T\_MIN$$

where T_MAX can be used to represent an output torque with an accelerator pedal opening when the driving state is in the most-sensitive state, that is, when A=1, which is the fifth torque; T_MIN can be used to represent an output torque with the accelerator pedal opening when the driving state is in the least-sensitive state, that is, when A=0, which is the fourth torque; the preset value can be 1.

In the above solution, as the driving state input by the user can be converted into the corresponding digital signal, and then the output torque can be calculated in real time through the digital signal, the research and development cycle can be shortened and the research and development cost can be reduced.

In an embodiment, determining the third product of the first target numerical value and the fifth torque includes: acquiring a preset coefficient, where the preset coefficient is used for indicating a driving state preference coefficient; determining a product of the first target numerical value, the preset coefficient and the fifth torque as the third product.

In this solution, the accuracy of calculating the output torque can be improved by setting the driving state preference coefficient. At this time, in the stage ① of the dynamic torque, for 0<A<1, the output torque $T_{01}$_ACT can be expressed as follows:

$$T_{01}\_ACT = A * K * T_{01}\_MAX + (1 - A) * T_{01}\_MIN.$$

In the stage ③ of the dynamic torque, for 0<A<1, the output torque $T_{34}$_ACT can be expressed as follows:

$$T_{34}\_ACT = A * K * T_{34}\_MAX + (1 - A) * T_{34}\_MIN.$$

In the steady-state torque, for 0<A<1, the output torque T_ACT can be expressed as follows:

$$T\_ACT = A * K * T\_MAX + (1 - A) * T\_MIN.$$

Among them, K can be used to represent the driving state preference coefficient.

In the above solution, as the driving state input by the user can be converted into the corresponding digital signal, and then the output torque can be calculated in real time through the digital signal, the research and development cycle can be shortened and the research and development cost can be reduced.

In an embodiment, the digital signal represents different gear-approaching moments in the gear-approaching process of the driving gear relative to the driven gear through different numerical values, and the electric-machinery control method further includes: determining a corresponding first moment when the digital signal is a third numerical value and a corresponding second moment when the digital signal is a fourth numerical value; determining a target gear-approaching moment in the gear-approaching process of the driving gear relative to the driven gear according to the first moment, the second moment and a second target numerical value when the digital signal is the second target numerical value; where the third numerical value is less than the fourth numerical value, the second target numerical value is larger than the third numerical value and less than the fourth numerical value, the first moment is a moment that the sensitivity corresponding to the driving state of the electric vehicle is the lowest, and the second moment is a moment that the sensitivity corresponding to the driving state of the electric vehicle is the highest.

Figure 16:
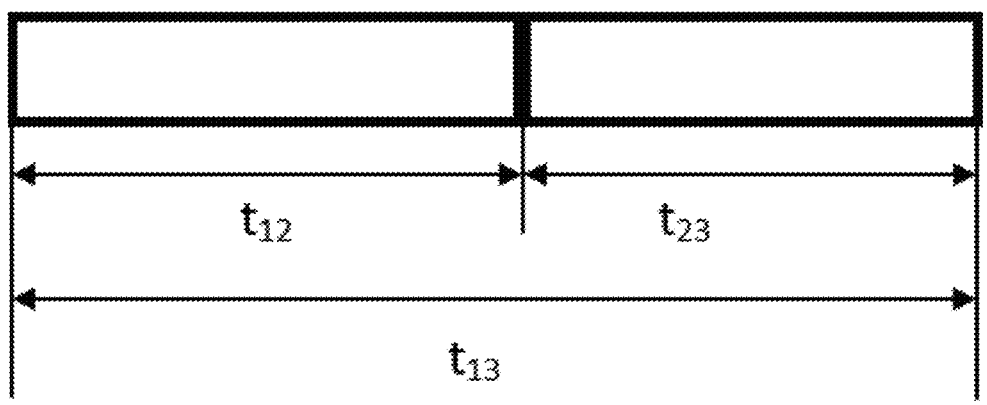
FIG. 16 is a schematic diagram of determining $t_{13}$ through $t_{12}$ and $t_{23}$ provided by an embodiment of the present application.

In this solution, the digital signal can also represent different gear-approaching moments in the gear-approaching process of the driving gear relative to the driven gear through different numerical values, that is, the gear-approaching process can be determined by setting $t_{12}$ and $t_{23}$ respectively. For the stage ② of the dynamic torque in FIG. 5, that is, the stage of gear-approaching of the driving gear, in the time interval of $t_{13}$, the driving state at this stage can be determined by controlling the time $t_{13}$ and torque $T_{13}$. In a preferred solution, the gear-approaching process can be controlled by determining time variables $t_{12}$ and $t_{23}$ of the gear-approaching, as shown in FIG. 16, which is a schematic diagram of determining $t_{13}$ through $t_{12}$ and $t_{23}$ provided by an embodiment of the present application. In FIG. 16, when the time variables $t_{12}$ and $t_{23}$ are determined, the time $t_{13}$ representing the total gear-approaching control time is also determined, and a process of determining a gear-approaching moment can be as shown in FIG. 17.

Figure 17:
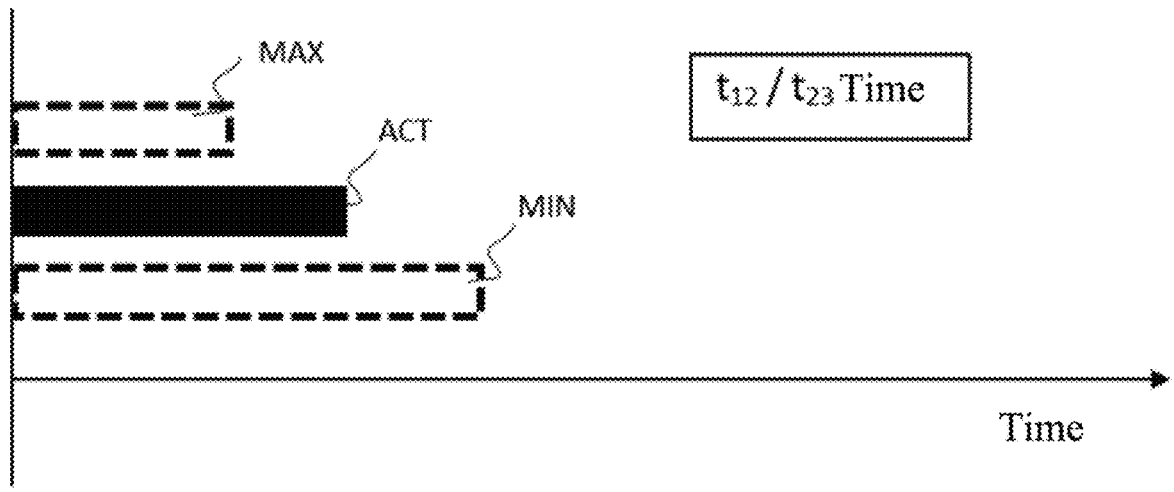
FIG. 17 is a schematic diagram of determining a gear-approaching moment provided by an embodiment of the present application.

FIG. 17 is a schematic diagram of determining a gear-approaching moment provided by an embodiment of the present application. In FIG. 17, for $t_{12}$ or $t_{23}$, MAX can be used to represent a time parameter corresponding to a gear-approaching moment when the driving state is the most-sensitive state, that is, when A=1; MIN can be used to represent a time parameter corresponding to a gear-approaching moment when the driving state is in the least-sensitive state, that is, when A=0; ACT can be used to represent a time parameter corresponding to a gear-approaching moment when the driving state is between the least-sensitive state and the most-sensitive state, that is, when 0<A<1. MAX and MIN are preset values.

In the above solution, the third numerical value can be 0, the fourth numerical value can be 1, and the second target numerical value can be any numerical value between 0 and 1. By calculating the gear-approaching moment in real time through the driving state input by the user, it can be realized that the output torque of the electric machinery is determined through the gear-approaching moment so as to control the driving gear to complete the gear-approaching operation, so that the research and development cycle can be shortened and the research and development cost can be reduced.

In an embodiment, determining the target gear-approaching moment in the gear-approaching process of the driving gear relative to the driven gear according to the first moment, the second moment and the second target numerical value includes: determining a fifth product of the second target numerical value and the second moment; determining a second target differential value between a preset value and the second target numerical value, and determining a sixth product of the second target differential value and the first moment; determining the sum of the fifth product and the sixth product as the target gear-approaching moment.

In this solution, for 0<A<1, the gear-approaching moment t_ACT can be expressed as follows:

$$\text{t\_ACT} = A * \text{t\_MAX} + (1 - A) * \text{t\_MIN}$$

or $$\text{t\_ACT} = A * K * \text{t\_MAX} + (1 - A) * \text{t\_MIN}$$

where A can be used to represent a second target numerical value, which can be any numerical value between 0 and 1; t_MAX can be used to represent a time parameter corresponding to the gear-approaching moment when the driving state is in the most-sensitive state, that is, when A=1, which is the second moment; t_MIN can be used to represent a time parameter corresponding to the gear-approaching moment when the driving state is in the least-sensitive state, that is, when A=0, which is the first moment; K can be used to represent the driving state preference coefficient; and the preset value can be 1.

In the above solution, by calculating the gear-approaching moment in real time through the driving state input by the user, it can be realized that the output torque of the electric machinery is determined through the gear-approaching moment so as to control the driving gear to complete the gear-approaching operation, so that the research and development cycle can be shortened and the research and development cost can be reduced.

In an embodiment, the adjustment operation for adjusting the driving state includes at least one of the following: performing a sliding operation on a virtual sliding component in a first sliding area, where the virtual sliding component is a component displayed on a display screen of the electric vehicle, the first sliding area is a preset area on the display screen, and different positions of the virtual sliding component on the first sliding area represent different driving states; performing a sliding operation on a physical sliding apparatus in a second sliding area, where the physical sliding apparatus is an apparatus arranged on the electric vehicle, the second sliding area is a preset area arranged on the electric vehicle, and different positions of the physical sliding apparatus on the second sliding area represent different driving states; performing a selecting operation on preset adjustable options, where the adjustable options include a virtual button displayed on the display screen and/or a physical button arranged on the electric vehicle, and different adjustable options represent different driving states.

In this solution, the operation component may be a display screen including an interactive interface in the vehicle. The virtual sliding component, which may be a virtual slider, can be arranged on the display screen, and the first sliding area of the virtual slider is set on the display screen. One side of the first sliding area indicates that the driving state is radical (i.e., sensitive), and the opposite side indicates that the driving state is mild (i.e., sluggish). The virtual slider can slide within the first sliding area, and different resident positions of the virtual slider in the first sliding area can be used to represent different driving states. Specifically, a plurality of button controls corresponding to preset driving states can be preset on the display screen, as shown in FIG. 18.

Figure 18:
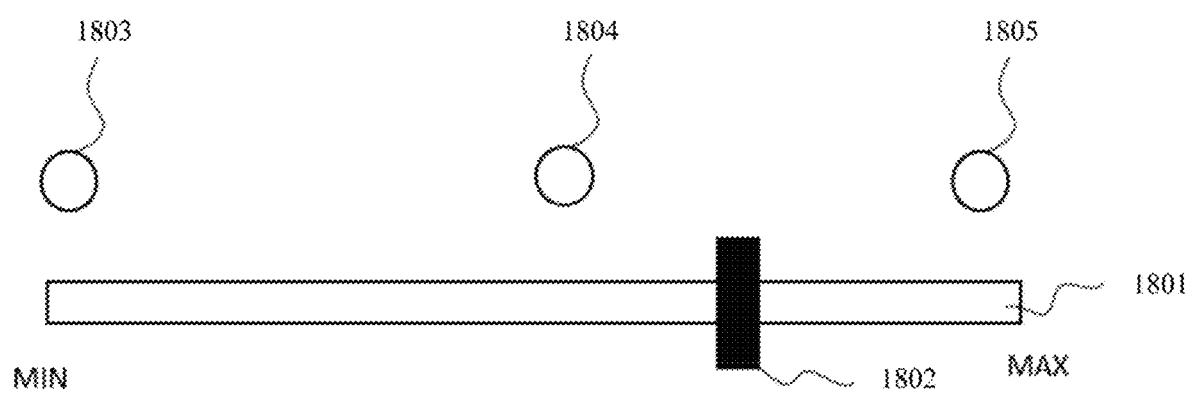
FIG. 18 is a schematic diagram of sliding of a virtual slider on a display screen provided by an embodiment of the present application.

FIG. 18 is a schematic diagram of sliding of a virtual slider on a display screen provided by an embodiment of the present application. In FIG. 18, a display screen is provided with a first sliding area 1801, a virtual slider 1802, a first button 1803, a second button 1804 and a third button 1805, where the leftmost MIN of the first sliding area 1801 indicates the mildest driving state, and the rightmost MAX indicates the most radical driving state. The user can control the virtual slider 1802 to slide in the first sliding area 1801 to adjust the driving state. The display screen is also provided with buttons 1803 to 1805. The three buttons correspond to different preset driving states respectively, and the user can directly adjust to the corresponding driving states by operating the three buttons.

In an embodiment, the display screen can also be provided with a plus button and a minus button, an up-arrow button, a down-arrow button, a left-arrow button and a right-arrow button, and the user can adjust the position of the virtual slider by operating these buttons.

In this solution, a plurality of adjustable options can also be set on the display screen, such as the first button, the second button and the third button. By selecting the adjustable option, the corresponding position of the first sliding area can be directly adjusted to.

In an embodiment, a plurality of memory settings can be set on the first sliding area, and each memory setting can store its corresponding virtual slider position to mark the driving state that the user selected. When the user selects a certain memory setting, the virtual slider can be directly adjusted to a slider position corresponding to the memory setting.

In an embodiment, when the virtual slider stays at a certain position on the first sliding area, or the user selects a button corresponding to a preset driving state, or the user selects a certain memory setting, the operation component can convert the position of the virtual slider at this time into a digital signal. The digital signal be transmitted to the next-level processing unit through a local internet network (LIN), a controller area network (CAN), Ethernet, Bluetooth, etc. The digital signal can be parsed into a digital value representing the driving state at this time after certain encoding or decoding. The digital signal can also be transmitted to the next-level processing unit by hard wire, and the current driving state can be indicated by the magnitude of a voltage, a current, a resistance or a duty ratio.

In this solution, the operation component can also be a mechanical operation area arranged in the vehicle. The physical sliding apparatus is arranged in the mechanical operation area, and the physical sliding apparatus can include a mechanical slider and a corresponding second sliding area. Mechanical buttons corresponding to a plurality of adjustable options can also be arranged to represent a plurality of preset driving states.

In the above solution, the user can choose the driving state of the vehicle between the allowed least-sensitive state and the allowed most-sensitive state according to his/her own preference or habit, so that the driving state of the vehicle can be better matched with the driving habit of the user and the driving experience of the user can be improved.

In an embodiment, when the adjustment operation is the selection operation for a preset adjustable option, the adjustable option corresponds to a preset position in the first sliding area and/or the second sliding area.

In this solution, when a plurality of adjustable options are provided on the display screen or the mechanical operation area, corresponding positions of buttons in the first sliding area and/or the second sliding area can be indicated by positions of the buttons relative to the first sliding area and/or the second sliding area, button colors, and/or line connections between the buttons and the first sliding area and/or the second sliding area. After the user operates these buttons, the virtual slider in the first sliding area and/or the second sliding area can be directly adjusted to be in the corresponding position.

In the above solution, the user can choose the driving state of the vehicle between the allowed least-sensitive state and the allowed most-sensitive state according to his/her own preference or habit, so that the driving state of the vehicle can be better matched with the driving habit of the user and the driving experience of the user can be improved.

In an embodiment, determining the output torque includes: obtaining a position signal corresponding to a target position in the first sliding area and/or the second sliding area in response to the adjustment operation, where the position signal represents different driving states of the electric vehicle through different numerical values; determining a corresponding sixth torque when the position signal is a fifth numerical value and a corresponding seventh torque when the digital signal is a sixth numerical value; determining the output torque according to the sixth torque, the seventh torque and a third target numerical value when the position signal is the third target numerical value; where the fifth numerical value is less than the sixth numerical value, the third target numerical value is greater than the fifth numerical value and less than the sixth numerical value, the sixth torque is a torque corresponding to a moment that the sensitivity corresponding to the driving state of the electric vehicle is the lowest, and the seventh torque is a torque corresponding to a moment that the sensitivity corresponding to the driving state of the electric vehicle is the highest.

In this solution, the output torque can also be determined according to the position of the virtual slider in the first sliding area or the position of the mechanical slider in the second sliding area.

Figure 19:
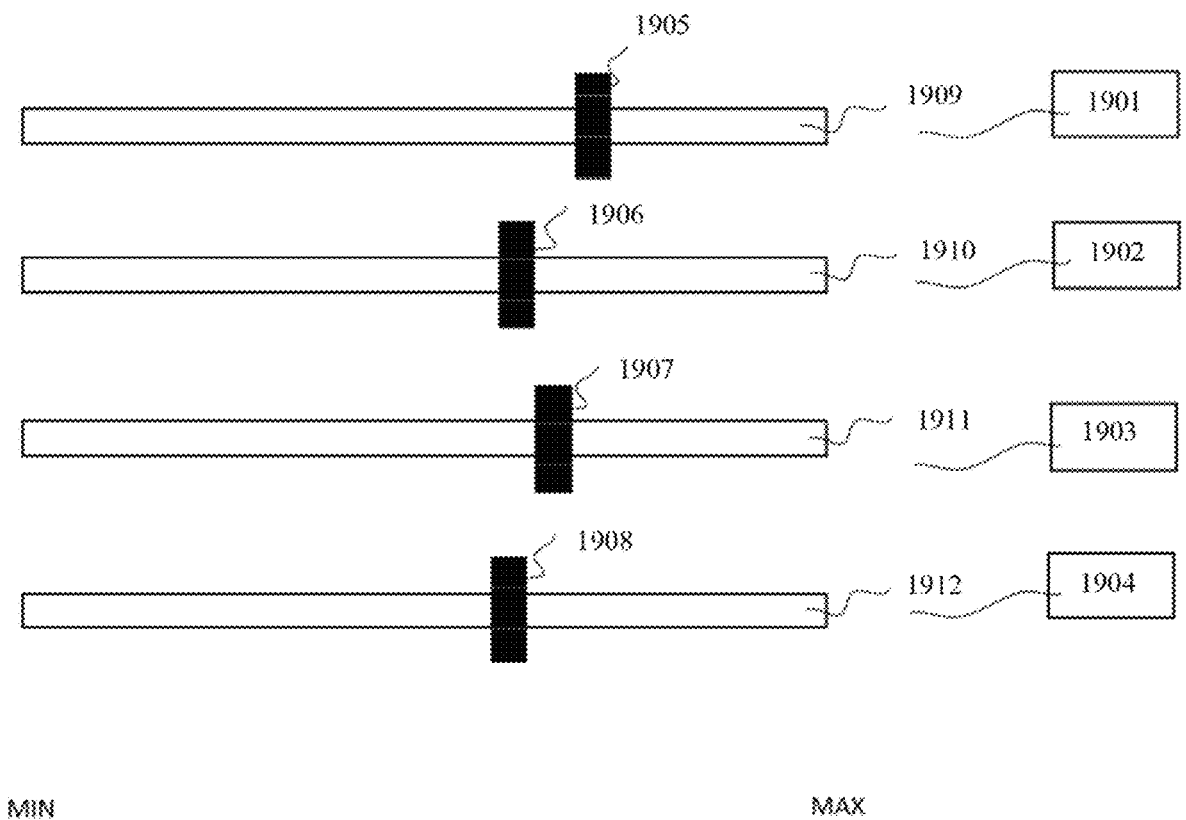
FIG. 19 is a schematic diagram of a plurality of adjustable options provided by an embodiment of the present application.

Specifically, a plurality of adjustable options can be provided in the operation component (which can be a display screen or a mechanical operation area) to adjust the driving state, as shown in FIG. 19, which is a schematic diagram of a plurality of adjustable options provided by an embodiment of the present application. In FIG. 19, four adjustable options are taken as an example, where 1901 to 1904 respectively represent four different adjustable options. A position of a slider corresponding to each adjustable option (shown as 1905 to 1908 in FIG. 19, which can be a virtual slider or a mechanical slider) in a sliding area (shown as 1909 to 1912 in FIG. 19, where the virtual slider corresponds to the first sliding area, and the mechanical slider corresponds to the second sliding area) may be different, which represents a different driving state. The operation component can acquire the position signal corresponding to the target position in the first sliding area and/or the second sliding area.

In the above solution, after the confirmation module receives the position signal transmitted by the operation component, the position signal can be expressed in the form of numerical value in the confirmation module. For example, the position signal can take any numerical value between 0 and 1. If the position signal is A, then:
- when A=0, it can be used to indicate a position signal when the driving state is in the least-sensitive state;
- when A=1, it can be used to indicate a position signal when the driving state is in the most-sensitive state;
- when 0<A<1, it can be used to indicate a position signal when the driving state is between the least-sensitive state and the most-sensitive state.

In this solution, the fifth numerical value can be 0, the sixth numerical value can be 1, and the third target numerical value can be any numerical value between 0 and 1. By determining the corresponding sixth torque when the position signal is the fifth numerical value and the corresponding seventh torque when the digital signal is the sixth numerical value, and further according to the third target numerical value, the output torque can be calculated.

In an embodiment, the adjustable options that can be provided include but are not limited to: steady-state maximum torque, steady-state minimum torque, torque rising slope, torque descending slope, gear-approaching time, gear-approaching torque, etc. Two or more adjustable options can be associated or merged, that is, when one of the adjustable options is adjusted, its associated adjustable option can also be adjusted accordingly.

In the above solution, as the driving state input by the user can be converted into the corresponding position signal in the sliding area, and then the output torque can be calculated in real time through this position signal, the research and development cycle can be shortened and the research and development cost can be reduced.

In an embodiment, determining the output torque according to the sixth torque, the seventh torque and the third target numerical value includes: determining a seventh product of the third target numerical value and the seventh torque; determining a third target differential value between a preset value and the third target numerical value, and determining an eighth product of the third target differential value and the sixth torque; determining the sum of the seventh product and the eighth product as the output torque.

In this solution, when the torque can be determined by the position signal, at this time, for 0<A<1, the output torque T_ACT can be expressed as follows:

$$T\_ACT = A * T\_MAX + (1 - A) * T\_MIN$$

or $$T\_ACT = A * T\_MAX + (1 - A) * T\_MIN$$

where A can be used to represent a third target numerical value, which can be any numerical value between 0 and 1; T_MAX can be used to represent a torque corresponding to a position signal when the driving state is in the most-sensitive state, that is, when A=1, which is the seventh torque; T_MIN can be used to represent a torque corresponding to a position signal when the driving state is in the least-sensitive state, that is, when A=0, which is the sixth torque; K can be used to represent the driving state preference coefficient; and the preset value can be 1.

In an embodiment, the gear-approaching moment can also be determined by the position signal. At this time, for 0<A<1, the gear-approaching moment t_ACT can be expressed as follows:

$$t\_ACT = A * t\_MAX + (1 - A) * t\_MIN$$

or $$t\_ACT = A * K * t\_MAX + (1 - A) * t\_MIN$$

where A can be used to represent a third target numerical value, which can be any numerical value between 0 and 1; t_MAX can be used to represent a gear-approaching moment corresponding to the position signal when the driving state is in the most-sensitive state, that is, when A=1; t_MIN can be used to indicate a gear-approaching moment corresponding to the position signal when the driving state is in the least-sensitive state, that is, when A=0; K can be used to represent the driving state preference coefficient; and the preset value can be 1.

In the above solution, the driving state input by the user is converted into the corresponding position signal in the sliding area, and then the output torque or the gear-approaching moment is calculated in real time through this position signal, thus, the research and development cycle can be shortened and the research and development cost can be reduced.

Generally speaking, the technical solutions provided by the present application are technical methods that can realize not only optimization of the driving performance of the electric vehicle, but also elimination of the noise and impact caused by the inertial impact.

Figure 20:
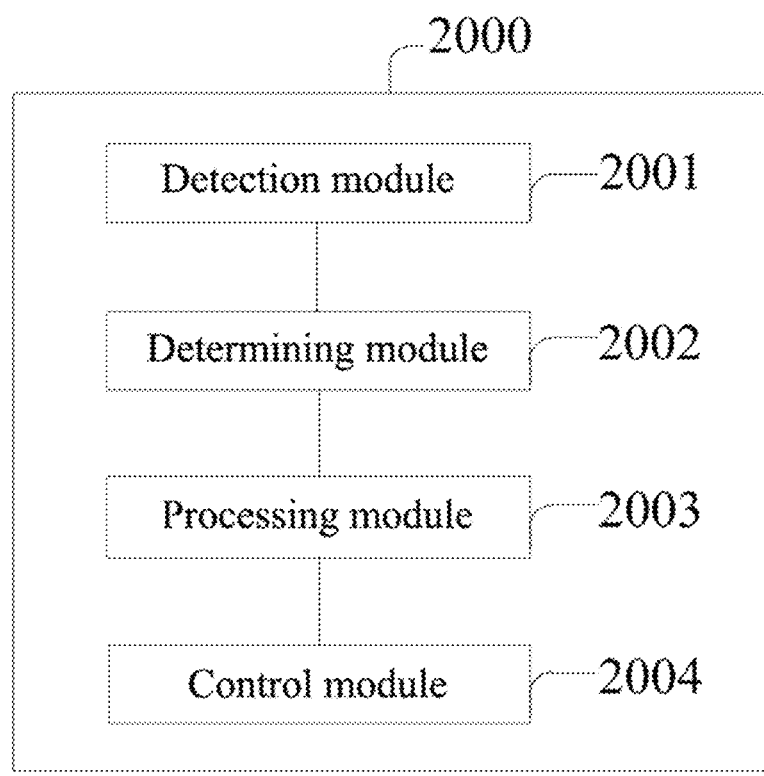
FIG. 20 is a schematic structural diagram of an electric-machinery control apparatus for an electric vehicle provided by an embodiment of the present application.

The present application further provides an electric-machinery control apparatus for an electric vehicle. FIG. 20 is a schematic structural diagram of an electric-machinery control apparatus for an electric vehicle provided by an embodiment of the present application. As shown in FIG. 20, the electric-machinery control apparatus 2000 for the electric vehicle includes:
- a detection module 2001, configured to detect a relative deformation amount of a transmission system between a driving gear and a wheel end of an electric machinery;
- a determining module 2002, configured to determine a first speed differential value between a first driving-gear rotational speed and a first wheel-end converted rotational speed when the relative deformation amount is a first threshold value, where the relative deformation amount being the first threshold value is used for indicating that the driving gear and a driven gear of the transmission system start to disengage, the first driving-gear rotational speed is a rotational speed of the driving gear at a disengagement moment that the driving gear and the driven gear disengage, and the first wheel-end converted rotational speed is a rotational speed obtained by performing a speed ratio conversion on a rotational speed of the wheel end of the electric vehicle at the disengagement moment;
- a processing module 2003, configure to determine an output torque of the electric machinery according to the first speed differential value; and
- a control module 2004, configured to control the driving gear to perform a gear-approaching operation relative to the driven gear according to the output torque.

In an embodiment, when determining the output torque of the electric machinery according to the first speed differential value, the processing module 2003 is specifically configured to: determine a product of the first speed differential value and a first time duration as a first product, where the first time duration is a time duration from the disengagement time to a contact moment that the driving gear and the driven gear contact; if the first product is less than a preset backlash value, determine that the output torque includes a first torque and a second torque, where a direction of the first torque and a direction of the second torque are opposite, the first torque is a torque required within a time interval from the disengagement moment to a transition moment that the electric machinery transitions between an acceleration state and a deceleration state, and the second torque is a torque required within a time interval from the transition moment to the contact moment.

In an embodiment, the electric-machinery control apparatus 2000 for the electric vehicle further includes a third determining module (not shown). The third determining module is specifically configured to determine the first torque and the second torque in a following manner: at the transition moment, determining a second speed differential value between a current driving-gear rotational speed and a second wheel-end converted rotational speed through the preset backlash value, the first speed differential value and the first time duration, where the second wheel-end converted rotational speed is a rotational speed obtained by performing a speed ratio conversion on the rotational speed of the wheel end of the electric vehicle at the transition moment; determining a second driving-gear rotational speed according to the second speed differential value and the second wheel-end converted rotational speed, where the second driving-gear rotational speed is a rotational speed of the driving gear at the transition moment; determining the first torque according to the second driving-gear rotational speed, the first driving-gear rotational speed, a time duration between the disengagement moment and the transition moment, and a sliding friction of the driving gear at the second driving-gear rotational speed; determining the second torque according to the second driving-gear rotational speed, a third driving-gear rotational speed, a time duration between the transition moment and the contact moment, and a sliding friction of the driving gear at the third driving-gear rotational speed, where the third driving-gear rotational speed is a rotational speed of the driving gear at the contact moment.

In an embodiment, when determining the output torque of the electric machinery according to the first speed differential value, the processing module 2003 is specifically configured to: if the first product is greater than or equal to the preset backlash value, determine a product of the first speed differential value and a second time duration as a second product, where the second time duration is a time duration from the disengagement moment to the transition moment; if the second product is less than the preset backlash value, determine that the output torque includes the first torque and the second torque, where the direction of the first torque and the direction of the second torque are the same.

In an embodiment, when determining the output torque of the electric machinery according to the first speed differential value, the processing module 2003 is specifically configured to: if the second product is greater than or equal to the preset backlash value, determine a third wheel-end converted rotational speed at a target moment, where the third wheel-end converted rotational speed is a rotational speed obtained by performing a speed ratio conversion on the rotational speed of the wheel end of the electric vehicle at the target moment, and the target moment is a moment that the driving gear and the driven gear re-contact within the second time duration; determine a third torque according to the third wheel-end converted rotational speed, the first driving-gear rotational speed, and a time duration between the disengagement moment and the target moment, where the third torque is a torque required within a time interval from the disengagement moment to the target moment, and the output torque includes the third torque.

In an embodiment, when detecting the relative deformation amount of the transmission system between the driving gear and the wheel end of the electric machinery, the detection module 2001 is further configured to: determine a third speed differential value between a current driving-gear rotational speed and a current driven-gear rotational speed upon detecting that the output torque of the electric machinery changes; determine a relative displacement of the driving gear and the driven gear according to the third speed differential value; and determine the relative deformation amount according to the relative displacement.

In an embodiment, when determining the output torque of the electric machinery, the processing module 2003 is specifically configured to: acquire driving state information corresponding to an adjusted target driving state in response to an adjustment operation for adjusting a driving state; perform conversion processing on the driving state information to obtain a digital signal; perform analysis processing on the digital signal to obtain a torque signal; and determine the output torque according to the torque signal.

In an embodiment, the digital signal represents different driving states of the electric vehicle through different numerical values, and when performing the analysis processing on the digital signal to obtain the torque signal, the processing module 2003 is specifically configured to: determine the torque signal to be a first preset signal when the digital signal is a first numerical value; determine the torque signal to be a second preset signal when the digital signal is a second numerical value; determine the torque signal to be a target signal according to the first preset signal, the second preset signal and a first target numerical value when the digital signal is the first target numerical value; where the first numerical value is less than the second numerical value, the first target numerical value is greater than the first numerical value and less than the second numerical value, the first preset signal is a torque signal when a sensitivity corresponding to the driving state of the electric vehicle is lowest, the second preset signal is a torque signal when the sensitivity corresponding to the driving state of the electric vehicle is highest, and the target signal is a torque signal when the sensitivity corresponding to the driving state of the electric vehicle is between a highest sensitivity and a lowest sensitivity.

In an embodiment, when the torque signal is the target signal, and when determining the output torque according to the torque signal, the processing module 2003 is specifically configured to: acquire a fourth torque corresponding to the first preset signal and a fifth torque corresponding to the second preset signal; determine a third product of the first target numerical value and the fifth torque; determine a first target differential value between a preset value and the first target numerical value, and determine a fourth product of the first target differential value and the fourth torque; determine a sum of the third product and the fourth product as the output torque.

In an embodiment, when determining the third product of the first target numerical value and the fifth torque, the processing module 2003 is specifically configured to: acquire a preset coefficient, where the preset coefficient is used for indicating a driving state preference coefficient; and determine a product of the first target numerical value, the preset coefficient and the fifth torque as the third product.

In an embodiment, the digital signal represents different gear-approaching moments in a gear-approaching process of the driving gear relative to the driven gear through different numerical values, and the processing module 2003 is further configured to: determine a corresponding first moment when the digital signal is a third numerical value and a corresponding second moment when the digital signal is a fourth numerical value; determine a target gear-approaching moment in the gear-approaching process of the driving gear relative to the driven gear according to the first moment, the second moment and a second target numerical value when the digital signal is the second target numerical value; where the third numerical value is less than the fourth numerical value, the second target numerical value is larger than the third numerical value and less than the fourth numerical value, the first moment is a moment that a sensitivity corresponding to the driving state of the electric vehicle is lowest, and the second moment is a moment that the sensitivity corresponding to the driving state of the electric vehicle is highest.

In an embodiment, when determining the target gear-approaching moment in the gear-approaching process of the driving gear relative to the driven gear according to the first moment, the second moment and the second target numerical value, the processing module 2003 is specifically configured to: determine a fifth product of the second target numerical value and the second moment; determine a second target differential value between a preset value and the second target numerical value, and determine a sixth product of the second target differential value and the first moment; and determine a sum of the fifth product and the sixth product as the target gear-approaching moment.

In an embodiment, the adjustment operation for adjusting the driving state includes at least one of the following: performing a sliding operation on a virtual sliding component in a first sliding area, where the virtual sliding component is a component displayed on a display screen of the electric vehicle, the first sliding area is a preset area on the display screen, and different positions of the virtual sliding component on the first sliding area represent different driving states; performing a sliding operation on a physical sliding apparatus in a second sliding area, where the physical sliding apparatus is an apparatus arranged on the electric vehicle, the second sliding area is a preset area arranged on the electric vehicle, and different positions of the physical sliding apparatus on the second sliding area represent different driving states; performing a selecting operation on preset adjustable options, where the adjustable options include a virtual button displayed on the display screen and/or a physical button arranged on the electric vehicle, and different adjustable options represent different driving states.

In an embodiment, when the adjustment operation is the selection operation for a preset adjustable option, the adjustable option corresponds to a preset position in the first sliding area and/or the second sliding area.

In an embodiment, when determining the output torque, the processing module 2003 is specifically configured to: acquire a position signal corresponding to a target position in the first sliding area and/or the second sliding area in response to the adjustment operation, where the position signal represents different driving states of the electric vehicle through different numerical values; determine a corresponding sixth torque when the position signal is a fifth numerical value and a corresponding seventh torque when the digital signal is a sixth numerical value; determine the output torque according to the sixth torque, the seventh torque and a third target numerical value when the position signal is the third target numerical value; where the fifth numerical value is less than the sixth numerical value, the third target numerical value is greater than the fifth numerical value and less than the sixth numerical value, the sixth torque is a torque corresponding to a moment that a sensitivity corresponding to the driving state of the electric vehicle is lowest, and the seventh torque is a torque corresponding to a moment that the sensitivity corresponding to the driving state of the electric vehicle is highest.

In an embodiment, when determining the output torque according to the sixth torque, the seventh torque and the third target numerical value, the processing module 2003 is specifically configured to: determine a seventh product of the third target numerical value and the seventh torque; determine a third target differential value between a preset value and the third target numerical value, and determine an eighth product of the third target differential value and the sixth torque; and determine a sum of the seventh product and the eighth product as the output torque.

The electric-machinery control apparatus for the electric vehicle provided in this embodiment is used to implement the technical solutions of the electric-machinery control method for the electric vehicle in the aforementioned method embodiments. Implementation principles and technical effects thereof are similar, and will not be repeated here.

Figure 21:
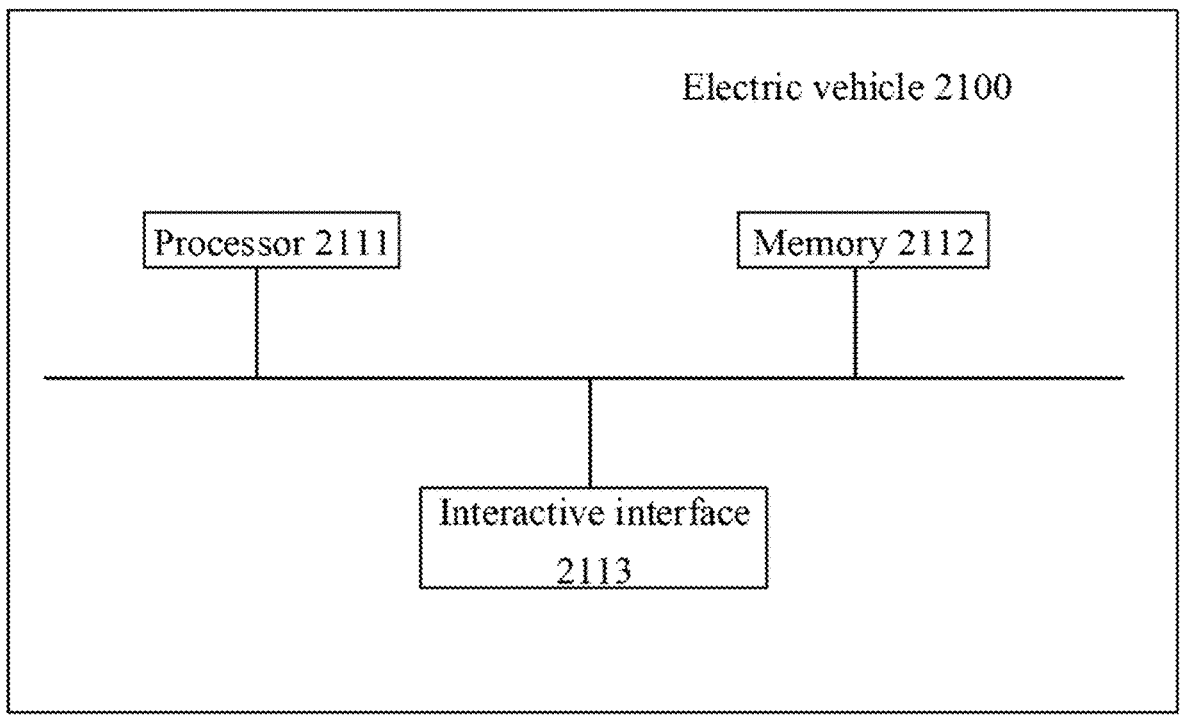
FIG. 21 is a block diagram of an electric vehicle according to an exemplary embodiment.

An embodiment of the present application also provides an electric vehicle. FIG. 21 is a schematic structural diagram of an electric vehicle according to an exemplary embodiment. As shown in FIG. 21, the electric vehicle 2100 includes:

a processor 2111, a memory 2112, and an interactive interface 2113;

the processor 2111 is connected with the memory 2112 and the interactive interface 2113; the memory 2112 is used for storing computer execution instructions executable by the processor 2111; the processor 2111 is configured to execute the technical solutions in the aforesaid electric-machinery control method for the electric vehicle by executing the computer execution instructions; the interactive interface 2113 provides an interface between the processor 2111 and a peripheral interface module.

In an embodiment, the memory 2112 may be independent or integrated with the processor 2111.

In an embodiment, when the memory 2112 is a device independent of the processor 2111, the electric vehicle 2100 may further include a bus for connecting the above devices.

In an embodiment, the memory may be, but not limited to, a random access memory (RAM), a read only memory (ROM), a programmable read-only memory (PROM), an erasable programmable read-only memory (EPROM), an electric erasable programmable read-only memory (EEPROM), etc. The memory is used for storing programs, and the processor executes the programs after receiving the execution instructions. Further, software programs and modules in the above-mentioned memory may also include an operating system, which may include various software components and/or drivers for managing system tasks (such as memory management, storage device control, power management, etc.), and may communicate with various hardware or software components, thereby providing an operating environment for other software components.

In an embodiment, the processor may be an integrated circuit chip with signal processing capability. The processor may be a general-purpose processor, including a central processing unit (CPU), a network processor (Network Processor, NP), etc. The methods, steps and logic blocks disclosed in the embodiments of the present application can be realized or executed. The general-purpose processor may be a microprocessor or the processor may be any conventional processor, etc.

An embodiment of the present application also provides a computer-readable storage medium, where computer execution instructions are stored in the computer-readable storage medium, and when the computer execution instructions are executed by a processor, the technical solutions of the electric-machinery control method for the electric vehicle as provided in the aforementioned method embodiments are implemented.

An embodiment of the present application also provides a computer program product, including a computer program. When the computer program is executed by a processor, the technical solutions of the electric-machinery control method for the electric vehicle as provided in the method embodiments are implemented.

It can be understood by those skilled in the art that all or part of the steps for implementing the above method embodiments can be completed by hardware related to program instructions. The aforementioned program can be stored in a computer-readable storage medium. When the program is executed, the steps including the above method embodiments are executed. The aforementioned storage media include a ROM, a RAM, a magnetic disk, an optical disk, or other media that can store program codes.

Finally, it should be explained that the above embodiments are only used to illustrate the technical solutions of the present application, but not to limit them. Although the present application has been described in detail with reference to the foregoing embodiments, it should be understood by those skilled in the art that the technical solutions described in the foregoing embodiments can still be modified, or some or all of the technical features therein can be replaced by equivalents. However, these modifications or replacements do not make the essence of the corresponding technical solutions deviate from the scope of the technical solutions of various embodiments of the present application.

What is claimed is:

1. An electric-machinery control method for an electric vehicle, comprising:
    detecting a relative deformation amount of a transmission system between a driving gear and a wheel end of an electric machinery;
    determining a first speed differential value between a first driving-gear rotational speed and a first wheel-end converted rotational speed when the relative deformation amount is a first threshold value, wherein the relative deformation amount being the first threshold value is used for indicating that the driving gear and a driven gear of the transmission system start to disengage, the first driving-gear rotational speed is a rotational speed of the driving gear at a disengagement moment that the driving gear and the driven gear disengage, and the first wheel-end converted rotational speed is a rotational speed obtained by performing a speed ratio conversion on a rotational speed of the wheel end of the electric vehicle at the disengagement moment;
    determining an output torque of the electric machinery according to the first speed differential value;
    controlling the driving gear to perform a gear-approaching operation relative to the driven gear according to the output torque.

2. The electric-machinery control method according to claim 1, wherein the determining the output torque of the electric machinery according to the first speed differential value comprises:
    determining a product of the first speed differential value and a first time duration as a first product, wherein the first time duration is a time duration from the disengagement time to a contact moment that the driving gear and the driven gear contact;
    if the first product is less than a preset backlash value, determining that the output torque comprises a first torque and a second torque, wherein a direction of the first torque and a direction of the second torque are opposite, the first torque is a torque required within a time interval from the disengagement moment to a transition moment that the electric machinery transitions between an acceleration state and a deceleration state, and the second torque is a torque required within a time interval from the transition moment to the contact moment.

3. The electric-machinery control method according to claim 2, wherein the first torque and the second torque are determined in a following manner:
    at the transition moment, determining a second speed differential value between a current driving-gear rotational speed and a second wheel-end converted rotational speed through the preset backlash value, the first speed differential value and the first time duration, wherein the second wheel-end converted rotational speed is a rotational speed obtained by performing a speed ratio conversion on the rotational speed of the wheel end of the electric vehicle at the transition moment;
    determining a second driving-gear rotational speed according to the second speed differential value and the second wheel-end converted rotational speed, wherein the second driving-gear rotational speed is a rotational speed of the driving gear at the transition moment;
    determining the first torque according to the second driving-gear rotational speed, the first driving-gear rotational speed, a time duration between the disengagement moment and the transition moment, and a sliding friction of the driving gear at the second driving-gear rotational speed;
    determining the second torque according to the second driving-gear rotational speed, a third driving-gear rotational speed, a time duration between the transition moment and the contact moment, and a sliding friction of the driving gear at the third driving-gear rotational speed, wherein the third driving-gear rotational speed is a rotational speed of the driving gear at the contact moment.

4. The electric-machinery control method according to claim 2, wherein the determining the output torque of the electric machinery according to the first speed differential value further comprises:
    if the first product is greater than or equal to the preset backlash value, determining a product of the first speed differential value and a second time duration as a second product, wherein the second time duration is a time duration from the disengagement moment to the transition moment;
    if the second product is less than the preset backlash value, determining that the output torque comprises the first torque and the second torque, wherein the direction of the first torque and the direction of the second torque are the same.

5. The electric-machinery control method according to claim 4, wherein the determining the output torque of the electric machinery according to the first speed differential value further comprises:
if the second product is greater than or equal to the preset backlash value, determining a third wheel-end converted rotational speed at a target moment, wherein the third wheel-end converted rotational speed is a rotational speed obtained by performing a speed ratio conversion on the rotational speed of the wheel end of the electric vehicle at the target moment, and the target moment is a moment that the driving gear and the driven gear re-contact within the second time duration;
determining a third torque according to the third wheel-end converted rotational speed, the first driving-gear rotational speed, and a time duration between the disengagement moment and the target moment, wherein the third torque is a torque required within a time interval from the disengagement moment to the target moment, and the output torque comprises the third torque.

6. The electric-machinery control method according to claim 1, wherein the detecting the relative deformation amount of the transmission system between the driving gear and the wheel end of the electric machinery further comprises:
determining a third speed differential value between a current driving-gear rotational speed and a current driven-gear rotational speed;
determining a relative displacement of the driving gear and the driven gear according to the third speed differential value;
determining the relative deformation amount according to the relative displacement.

7. The electric-machinery control method according to claim 1, wherein the determining the output torque of the electric machinery comprises:
acquiring driving state information corresponding to an adjusted target driving state in response to an adjustment operation for adjusting a driving state;
performing conversion processing on the driving state information to obtain a digital signal;
performing analysis processing on the digital signal to obtain a torque signal;
determining the output torque according to the torque signal.

8. The electric-machinery control method according to claim 7, wherein the digital signal represents different driving states of the electric vehicle through different numerical values, and the performing the analysis processing on the digital signal to obtain the torque signal comprises:
determining the torque signal to be a first preset signal when the digital signal is a first numerical value;
determining the torque signal to be a second preset signal when the digital signal is a second numerical value;
determining the torque signal to be a target signal according to the first preset signal, the second preset signal and a first target numerical value when the digital signal is the first target numerical value;
wherein the first numerical value is less than the second numerical value, the first target numerical value is greater than the first numerical value and less than the second numerical value, the first preset signal is a torque signal when a sensitivity corresponding to the driving state of the electric vehicle is lowest, the second preset signal is a torque signal when the sensitivity corresponding to the driving state of the electric vehicle is highest, and the target signal is a torque signal when the sensitivity corresponding to the driving state of the electric vehicle is between a highest sensitivity and a lowest sensitivity.

9. The electric-machinery control method according to claim 8, wherein when the torque signal is the target signal, the determining the output torque according to the torque signal comprises:
acquiring a fourth torque corresponding to the first preset signal and a fifth torque corresponding to the second preset signal;
determining a third product of the first target numerical value and the fifth torque;
determining a first target differential value between a preset value and the first target numerical value, and determining a fourth product of the first target differential value and the fourth torque;
determining a sum of the third product and the fourth product as the output torque.

10. The electric-machinery control method according to claim 9, wherein the determining the third product of the first target numerical value and the fifth torque comprises:
acquiring a preset coefficient, wherein the preset coefficient is used for indicating a driving state preference coefficient;
determining a product of the first target numerical value, the preset coefficient and the fifth torque as the third product.

11. The electric-machinery control method according to claim 7, wherein the digital signal represents different gear-approaching moments in a gear-approaching process of the driving gear relative to the driven gear through different numerical values, and the electric-machinery control method further comprises:
determining a corresponding first moment when the digital signal is a third numerical value and a corresponding second moment when the digital signal is a fourth numerical value;
determining a target gear-approaching moment in the gear-approaching process of the driving gear relative to the driven gear according to the first moment, the second moment and a second target numerical value when the digital signal is the second target numerical value;
wherein the third numerical value is less than the fourth numerical value, the second target numerical value is larger than the third numerical value and less than the fourth numerical value, the first moment is a moment that a sensitivity corresponding to the driving state of the electric vehicle is lowest, and the second moment is a moment that the sensitivity corresponding to the driving state of the electric vehicle is highest.

12. The electric-machinery control method according to claim 11, wherein the determining the target gear-approaching moment in the gear-approaching process of the driving gear relative to the driven gear according to the first moment, the second moment and the second target numerical value comprises:
determining a fifth product of the second target numerical value and the second moment;
determining a second target differential value between a preset value and the second target numerical value, and determining a sixth product of the second target differential value and the first moment;
determining a sum of the fifth product and the sixth product as the target gear-approaching moment.

13. The electric-machinery control method according to claim 7, wherein the adjustment operation for adjusting the driving state comprises at least one of the following:
- performing a sliding operation on a virtual sliding component in a first sliding area, wherein the virtual sliding component is a component displayed on a display screen of the electric vehicle, the first sliding area is a preset area on the display screen, and different positions of the virtual sliding component on the first sliding area represent different driving states;
- performing a sliding operation on a physical sliding apparatus in a second sliding area, wherein the physical sliding apparatus is an apparatus arranged on the electric vehicle, the second sliding area is a preset area arranged on the electric vehicle, and different positions of the physical sliding apparatus on the second sliding area represent different driving states;
- performing a selecting operation on preset adjustable options, wherein the adjustable options comprise at least one of a virtual button displayed on the display screen and/or a physical button arranged on the electric vehicle, and different adjustable options represent different driving states.

14. The electric-machinery control method according to claim 13, wherein when the adjustment operation is the selection operation for a preset adjustable option, the adjustable option corresponds to at least one of a preset position in the first sliding area and/or a preset position in the second sliding area.

15. The electric-machinery control method according to claim 14, wherein the determining the output torque comprises:
- acquiring a position signal corresponding to a target position in the first sliding area and/or the second sliding area in response to the adjustment operation, wherein the position signal represents different driving states of the electric vehicle through different numerical values;
- determining a corresponding sixth torque when the position signal is a fifth numerical value and a corresponding seventh torque when the digital signal is a sixth numerical value;
- determining the output torque according to the sixth torque, the seventh torque and a third target numerical value when the position signal is the third target numerical value;
- wherein the fifth numerical value is less than the sixth numerical value, the third target numerical value is greater than the fifth numerical value and less than the sixth numerical value, the sixth torque is a torque corresponding to a moment that a sensitivity corresponding to the driving state of the electric vehicle is lowest, and the seventh torque is a torque corresponding to a moment that the sensitivity corresponding to the driving state of the electric vehicle is highest.

16. The electric-machinery control method according to claim 15, wherein the determining the output torque according to the sixth torque, the seventh torque and the third target numerical value comprises:
- determining a seventh product of the third target numerical value and the seventh torque;
- determining a third target differential value between a preset value and the third target numerical value, and determining an eighth product of the third target differential value and the sixth torque;
- determining a sum of the seventh product and the eighth product as the output torque.

17. An electric-machinery control apparatus for an electric vehicle, comprising:
- at least one processor and a memory;
- the memory stores computer executable instructions;
- the at least one processor executes the computer executable instructions stored in the memory to:
- detect a relative deformation amount of a transmission system between a driving gear and a wheel end of an electric machinery;
- determine a first speed differential value between a first driving-gear rotational speed and a first wheel-end converted rotational speed when the relative deformation amount is a first threshold value, wherein the relative deformation amount being the first threshold value is used for indicating that the driving gear and a driven gear of the transmission system start to disengage, the first driving-gear rotational speed is a rotational speed of the driving gear at a disengagement moment that the driving gear and the driven gear disengage, and the first wheel-end converted rotational speed is a rotational speed obtained by performing a speed ratio conversion on a rotational speed of the wheel end of the electric vehicle at the disengagement moment;
- determine an output torque of the electric machinery according to the first speed differential value;
- control the driving gear to perform a gear-approaching operation relative to the driven gear according to the output torque.

18. The electric-machinery control apparatus according to claim 17, the processor is specifically configured to:
- determine a product of the first speed differential value and a first time duration as a first product, wherein the first time duration is a time duration from the disengagement time to a contact moment that the driving gear and the driven gear contact;
- if the first product is less than a preset backlash value, determine that the output torque comprises a first torque and a second torque, wherein a direction of the first torque and a direction of the second torque are opposite, the first torque is a torque required within a time interval from the disengagement moment to a transition moment that the electric machinery transitions between an acceleration state and a deceleration state, and the second torque is a torque required within a time interval from the transition moment to the contact moment.

19. The electric-machinery control apparatus according to claim 17, the processor is specifically configured to:
- at the transition moment, determine a second speed differential value between a current driving-gear rotational speed and a second wheel-end converted rotational speed through the preset backlash value, the first speed differential value and the first time duration, wherein the second wheel-end converted rotational speed is a rotational speed obtained by performing a speed ratio conversion on the rotational speed of the wheel end of the electric vehicle at the transition moment;
- determine a second driving-gear rotational speed according to the second speed differential value and the second wheel-end converted rotational speed, wherein the second driving-gear rotational speed is a rotational speed of the driving gear at the transition moment;
- determine the first torque according to the second driving-gear rotational speed, the first driving-gear rotational speed, a time duration between the disengagement moment and the transition moment, and a sliding friction of the driving gear at the second driving-gear rotational speed;

determine the second torque according to the second driving-gear rotational speed, a third driving-gear rotational speed, a time duration between the transition moment and the contact moment, and a sliding friction of the driving gear at the third driving-gear rotational speed, wherein the third driving-gear rotational speed is a rotational speed of the driving gear at the contact moment.

20. A non-transitory computer-readable storage medium, wherein the non-transitory computer-readable storage medium stores computer execution instructions, and when the computer execution instructions are executed by a processor, the processor is enabled to:

detect a relative deformation amount of a transmission system between a driving gear and a wheel end of an electric machinery;

determine a first speed differential value between a first driving-gear rotational speed and a first wheel-end converted rotational speed when the relative deformation amount is a first threshold value, wherein the relative deformation amount being the first threshold value is used for indicating that the driving gear and a driven gear of the transmission system start to disengage, the first driving-gear rotational speed is a rotational speed of the driving gear at a disengagement moment that the driving gear and the driven gear disengage, and the first wheel-end converted rotational speed is a rotational speed obtained by performing a speed ratio conversion on a rotational speed of the wheel end of the electric vehicle at the disengagement moment;

determine an output torque of the electric machinery according to the first speed differential value; and control the driving gear to perform a gear-approaching operation relative to the driven gear according to the output torque.

* * * * *